(12) United States Patent
Fujioka et al.

(10) Patent No.: US 12,244,248 B2
(45) Date of Patent: Mar. 4, 2025

(54) POWER CONVERSION DEVICE

(71) Applicant: Mitsubishi Electric Corporation, Tokyo (JP)

(72) Inventors: Kazuhiro Fujioka, Tokyo (JP); Yoshiaki Ishiguro, Tokyo (JP); Ryota Kondo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 142 days.

(21) Appl. No.: 18/306,569

(22) Filed: Apr. 25, 2023

(65) Prior Publication Data

US 2023/0387827 A1    Nov. 30, 2023

(30) Foreign Application Priority Data

May 31, 2022 (JP) .................................. 2022-088247

(51) Int. Cl.
| | |
|---|---|
| *H02M 1/32* | (2007.01) |
| *H02M 1/00* | (2006.01) |
| *H02M 1/42* | (2007.01) |
| *H02M 7/48* | (2007.01) |
| *H02M 7/5395* | (2006.01) |

(52) U.S. Cl.
CPC ....... *H02M 7/5395* (2013.01); *H02M 1/0019* (2021.05); *H02M 1/0025* (2021.05); *H02M 7/4803* (2021.05); *H02M 1/32* (2013.01); *H02M 1/4225* (2013.01)

(58) Field of Classification Search
CPC .............................. H02M 1/32; H02M 1/4225
See application file for complete search history.

(56) References Cited

U.S. PATENT DOCUMENTS

| | | | |
|---|---|---|---|
| 12,095,384 B2 * | 9/2024 | Betsuin ................. | H02M 1/007 |
| 2015/0263624 A1 * | 9/2015 | Nobe ..................... | H02M 1/32 |
| | | | 323/299 |
| 2016/0065073 A1 * | 3/2016 | Katsuki ................ | H02M 3/155 |
| | | | 323/271 |
| 2019/0305685 A1 * | 10/2019 | Miki .................... | H02M 1/0025 |

FOREIGN PATENT DOCUMENTS

| | | | | |
|---|---|---|---|---|
| JP | 2017-208968 A | 11/2017 | | |
| WO | WO-2010122880 A1 * | 10/2010 | ....... | H01L 21/02071 |

* cited by examiner

*Primary Examiner* — Gary A Nash
(74) *Attorney, Agent, or Firm* — Sughrue Mion, PLLC

(57) ABSTRACT

A setting unit sets a duty ratio of a PWM signal based on a target voltage value, and outputs the duty ratio to a voltage conversion circuit. An estimated value calculation unit cyclically calculates an estimated duty ratio value based on the detected input voltage value and the detected output voltage value. An abnormality detection unit cyclically calculates, as a difference value, a difference between an updated estimated value and a comparison reference value, and detects abnormality of a voltage detection unit based on a change in calculated difference value. The updated estimated value is a newly calculated estimated duty ratio value. The comparison reference value is a value based on the estimated duty ratio value calculated in a cycle prior to a cycle in which the updated estimated value is calculated.

10 Claims, 16 Drawing Sheets

POWER CONVERSION DEVICE

BACKGROUND OF THE INVENTION

1. Field of the Invention

This disclosure relates to a power conversion device.

2. Description of the Related Art

In a voltage conversion device of the related art, a duty ratio of a PWM signal is estimated based on one of an input voltage of a voltage conversion unit or an output voltage of the voltage conversion unit and on a target voltage. The PWM signal is a control signal input to the voltage conversion unit. The input voltage and the output voltage are detected by a voltage detection unit. An abnormality determination unit determines whether a difference between a duty ratio of the PWM signal that is estimated when the voltage conversion unit is in a stable state and an actually set duty ratio converges to a value less than a fixed value (for example, Japanese Patent Application Laid-Open No. 2017-208968).

Normally, the voltage detection unit fluctuates in characteristics as a piece of hardware. Examples of the fluctuations in characteristics include fluctuations caused by an ambient temperature of the piece of hardware and fluctuations caused by deterioration with age of the piece of hardware. In detection of abnormality of the voltage detection unit in the voltage conversion device as described above, precision of abnormality detection is lowered by those fluctuations. A resultant problem is that abnormality of the voltage detection unit cannot be detected appropriately.

SUMMARY OF THE INVENTION

This disclosure has been made to solve the problem described above, and an object of this disclosure is to provide a power conversion device capable of detecting abnormality of a voltage detection unit more appropriately.

According to at least one embodiment of this disclosure, there is provided a power conversion device including: a voltage conversion circuit; a voltage detection unit including: an input voltage detector configured to detect, as a detected input voltage value, an input voltage input to the voltage conversion circuit; and an output voltage detector configured to detect, as a detected output voltage value, an output voltage output from the voltage conversion circuit; and a control unit configured to control the voltage conversion circuit, the control unit including: a setting unit configured to set, based on a target voltage value which is a target value of the output voltage, a duty ratio of a PWM signal to be given to the voltage conversion circuit, and configured to output the PWM signal based on the set duty ratio to the voltage conversion circuit; an estimated value calculation unit configured to cyclically calculate, based on the detected input voltage value and the detected output voltage value, an estimated duty ratio value which is a duty ratio of the PWM signal supposed to be output from the setting unit to the voltage conversion circuit with a premise of a relationship between the detected input voltage value and the detected output voltage value; and an abnormality detection unit configured to detect abnormality of the voltage detection unit based on a change of a difference value, the difference value being a cyclically calculated difference between an updated estimated value and a comparison reference value, the updated estimated value being the estimated duty ratio value newly calculated by the estimated value calculation unit, the comparison reference value being based on the estimated duty ratio value calculated by the estimated value calculation unit in a cycle prior to a cycle in which the updated estimated value is calculated.

According to the power conversion device of the at least one embodiment of this disclosure, it is possible to detect abnormality of the voltage detection unit more appropriately.

DESCRIPTION OF THE EMBODIMENTS

Now, embodiments of this disclosure are described with reference to the drawings.

First Embodiment

Figure 1:
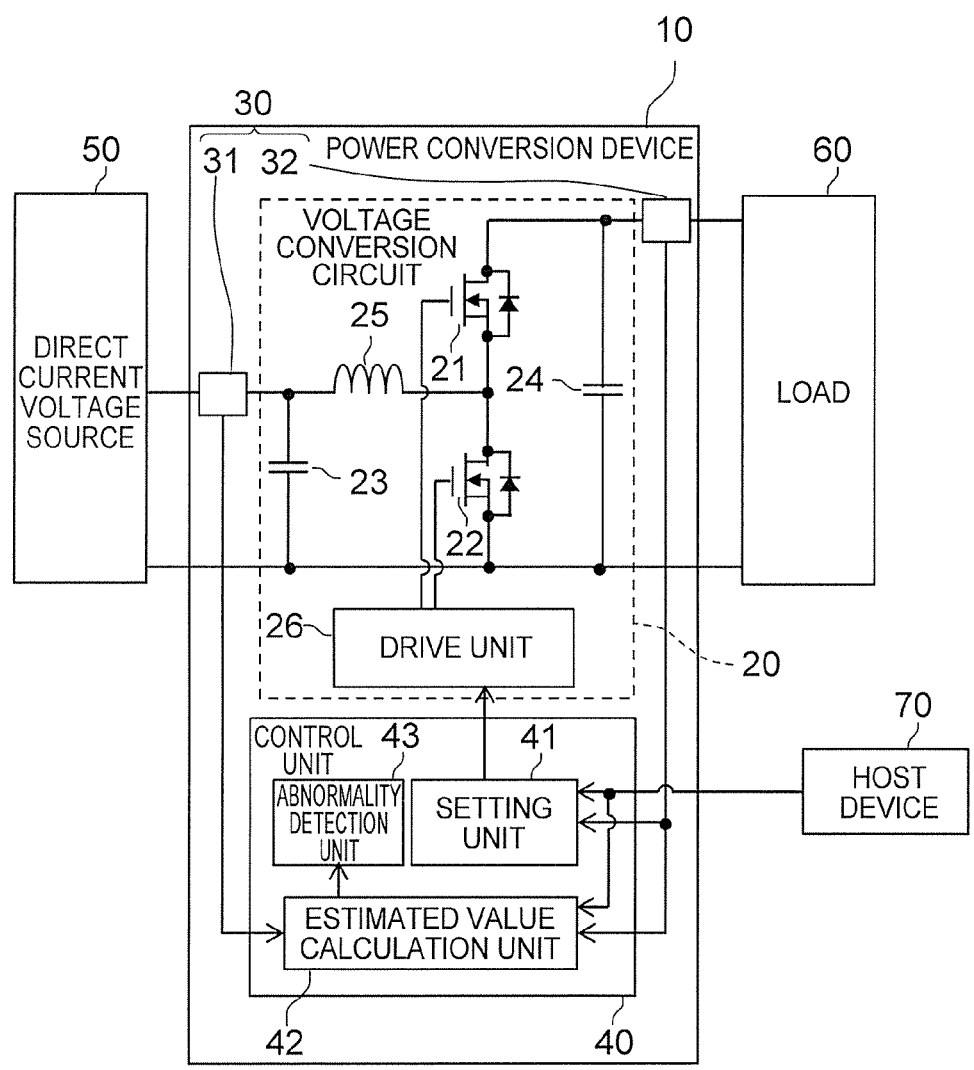
FIG. 1 is a configuration diagram for illustrating a power conversion device according to a first embodiment of this disclosure, with parts of the power conversion device illustrated in the form of a block diagram.

FIG. 1 is a configuration diagram for illustrating a power conversion device according to a first embodiment of this disclosure, with parts of the power conversion device illustrated in the form of a block diagram. A power conversion device 10 includes a voltage conversion circuit 20, a voltage detection unit 30, and a control unit 40.

The voltage conversion circuit 20 is connected to a direct current voltage source 50 serving as an external power source. The voltage conversion circuit 20 is also connected to a load 60. The voltage conversion circuit 20 converts an input voltage to an output voltage. The input voltage is a voltage input to the voltage conversion circuit 20 from the direct current voltage source 50. The output voltage is a voltage output from the voltage conversion circuit 20 to the load 60.

The voltage conversion circuit 20 includes a first switching element 21, a second switching element 22, an input capacitor 23, an output capacitor 24, a reactor 25, and a drive unit 26.

The first switching element 21 and the second switching element 22 each include a metal oxide semiconductor field effect transistor (MOSFET) and a diode. The diode is connected in anti-parallel between a source and a drain of the MOSFET. That is, a cathode of the diode is connected to the source of the MOSFET and an anode of the diode is connected to the drain of the MOSFET. This diode is accordingly called an anti-parallel diode. The anti-parallel diode is built in the MOSFET. A silicon carbide (SiC) semiconductor is used for the MOSFET.

A drain terminal of the first switching element 21 is connected to a positive side of the load 60. A source terminal of the first switching element 21 is connected to a drain terminal of the second switching element 22. A source terminal of the second switching element 22 is connected to a negative side of the load 60.

The input capacitor 23 is connected between a positive side of the direct current voltage source 50 and a negative side of the direct current voltage source 50. The input capacitor 23 prevents a component of noise generated by operation of switching on or off the first switching element 21 and a component of noise generated by operation of switching on or off the second switching element 22 from flowing toward the direct current voltage source 50. The input capacitor 23 smooths out fluctuations in voltage generated by the direct current voltage source 50.

The output capacitor 24 is connected between a positive side of the load 60 and a negative side of the load 60. That is, the output capacitor 24 is connected between the drain terminal of the first switching element 21 and the source terminal of the second switching element 22. The output capacitor 24 handles supply of power to the load 60 when the first switching element 21 is switched off. The output capacitor 24 also prevents a component of the noise generated by the operation of switching on or off the first switching element 21 and a component of the noise generated by the operation of switching on or off the second switching element 22 from flowing to the load 60.

One end of the reactor 25 is connected to the positive side of the direct current voltage source 50. The other end of the reactor 25 is connected to the source terminal of the first switching element 21 and the drain terminal of the second switching element 22.

The drive unit 26 includes a buffer circuit that includes, for example, a driver integrated circuit (IC). A pulse width modulation (PWM) signal is input to the drive unit 26 from the control unit 40. The PWM signal is a signal to be given to the voltage conversion circuit 20. The drive unit 26 uses a buffer circuit to amplify the input PWM signal, and applies the amplified PWM signal between the gate terminal and the source terminal of the first switching element 21, and between the gate terminal and the source terminal of the second switching element 22.

The drive unit 26 executes the operation of switching on and off the first switching element 21 and the second switching element 22 alternatingly in accordance with the input PWM signal. In this manner, energy accumulation in the reactor 25 and supply of the accumulated energy to the load 60 and to the output capacitor 24 are alternated, and the output voltage is stepped up to a voltage higher than the input voltage. That is, the voltage conversion circuit 20 is a step-up DC/DC converter.

The voltage detection unit 30 includes an input voltage detector 31 and an output voltage detector 32. The input voltage detector 31 detects, as a detected input voltage value V1, an input voltage input to the voltage conversion circuit 20. The output voltage detector 32 detects, as a detected output voltage value V2, an output voltage output from the voltage conversion circuit 20.

The input voltage detector 31 and the output voltage detector 32 each include a voltage dividing resistor, an insulating element, and an A/D converter. The voltage dividing resistor lowers the voltage of the voltage conversion circuit 20 to a level of an operating voltage of the control unit 40. The insulating element is an element for insulating the voltage conversion circuit 20 and the control unit 40 from each other. The A/D converter converts a detected voltage into a digital value.

The control unit 40 includes, as function blocks, a setting unit 41, an estimated value calculation unit 42, and an abnormality detection unit 43.

The setting unit 41 sets a duty ratio of the PWM signal based on a target voltage value and on the detected output voltage value V2. The target voltage value is a target value of the output voltage of the voltage conversion circuit 20. The target voltage value is determined by a host device 70. To give a more specific description, the setting unit 41 sets the duty ratio of the PWM signal so that the detected output voltage value V2 approaches the target voltage value through PI control. The setting unit 41 outputs the PWM signal to the drive unit 26 of the voltage conversion circuit 20.

The estimated value calculation unit 42 cyclically calculates an estimated duty ratio value based on the detected input voltage value V1 and the detected output voltage value V2. The estimated duty ratio value is a duty ratio at which the PWM signal from the setting unit 41 is supposed to be output to the voltage conversion circuit 20 with a premise of a relationship between the detected input voltage value V1 and the detected output voltage value V2. The estimated value calculation unit 42 also stores the cyclically calculated estimated duty ratio value.

When the estimated duty ratio value at a cycle number "n" is given as D(n), the estimated duty ratio value D(n) is expressed by Expression (1). In Expression (1), V1(n) represents the detected input voltage value V1 at the cycle number "n", V2(n) represents the detected output voltage value V2 at the cycle number "n". The estimated duty ratio value D(n) of Expression (1) is established when the voltage conversion circuit 20 is a step-up DC/DC converter.

$$D(n)=(V2(n)-V1(n))/V2(n) \quad (1)$$

The abnormality detection unit 43 cyclically calculates, as a difference value, a difference between an updated estimated value and a comparison reference value. The updated estimated value is an estimated duty ratio value newly calculated by the estimated value calculation unit 42. The comparison reference value is a value based on the estimated duty ratio value that has been calculated by the estimated value calculation unit 42 in a cycle prior to a cycle in which the updated estimated value is calculated. The abnormality detection unit 43 detects abnormality of the voltage detection unit 30 based on a change in calculated difference value.

The updated estimated value at the cycle number "n" is the estimated duty ratio value D(n) calculated at the cycle number "n".

When the comparison reference value is given as Cmp and the difference value at the cycle number "n" is given as ΔD(n), the difference value ΔD(n) is expressed by Expression (2).

$$\Delta D(n)=D(n)-Cmp \quad (2)$$

In the first embodiment, the comparison reference value Cmp is the estimated duty ratio value acquired in a cycle that immediately precedes a cycle in which the updated estimated value is acquired. That is, Expression (2) is expressed by Expression (3).

$$\Delta D(n)=D(n)-D(n-1) \quad (3)$$

When abnormality of the voltage detection unit 30 is detected, the abnormality detection unit 43 notifies the abnormality of the voltage detection unit 30 to the host device 70. The setting unit 41 subsequently receives a command of the host device 70 issued in response to the notification of the abnormality. The first switching element 21 and the second switching element 22 are controlled in accordance with the command from the host device 70. The command from the host device 70 is, for example, a command for stopping the switching operation of the first switching element 21 and the switching operation of the second switching element 22. Another example of the command from the host device 70 is a command commanding the first switching element 21 and the second switching element 22 to continue the switching operation at a certain duty ratio.

The direct current voltage source 50 includes a secondary cell. Examples of the secondary cell include a battery, a lithium ion cell, and a nickel cadmium cell.

The host device 70 includes, for example, an electronic control unit (ECU). The host device 70 transmits the target voltage value and information about fluctuations of the load 60 to the control unit 40. The information about fluctuations of the load 60 is, for example, a load current value.

Figure 2:
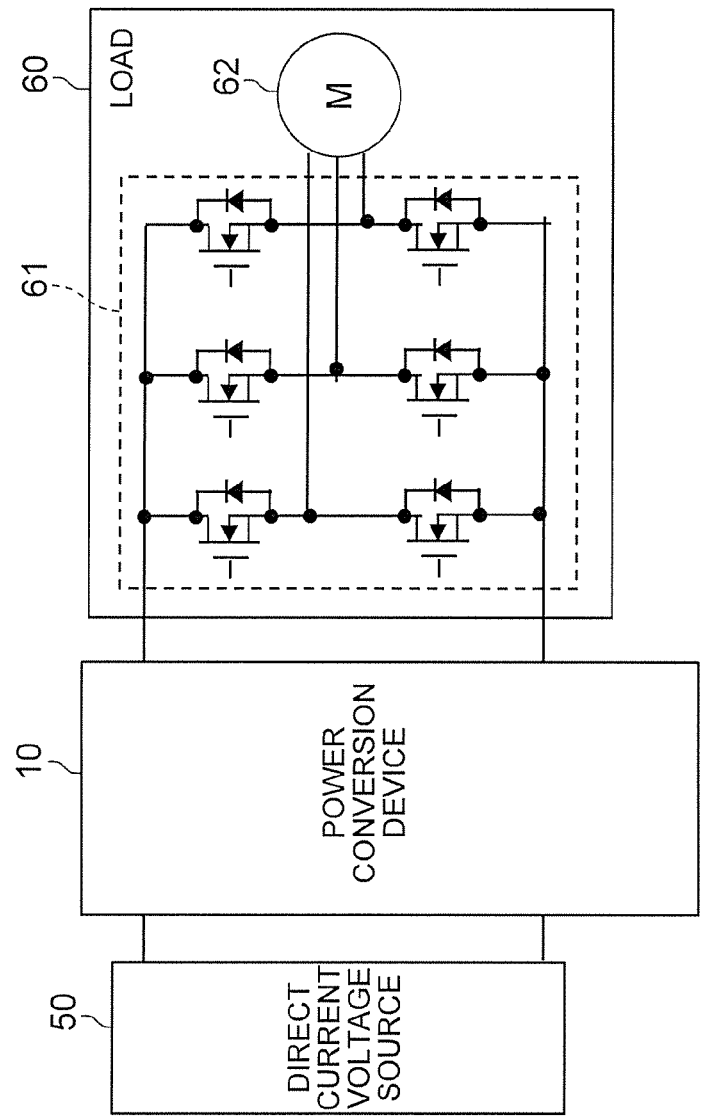
FIG. 2 is a configuration diagram of the power conversion device in a case in which an inverter circuit and a motor are applied as a load of FIG. 1.

FIG. 2 is a configuration diagram of the power conversion device 10 in a case in which an inverter circuit and a motor are applied as the load 60 of FIG. 1. The load 60 includes an inverter circuit 61 and a motor 62. The inverter circuit 61 includes six switching elements. When the load 60 is a load including switching elements as in this case, the output capacitor 24 prevents components of noise generated by operation of switching the switching elements of the load 60 on or off from flowing into the voltage conversion circuit 20.

Figure 3:
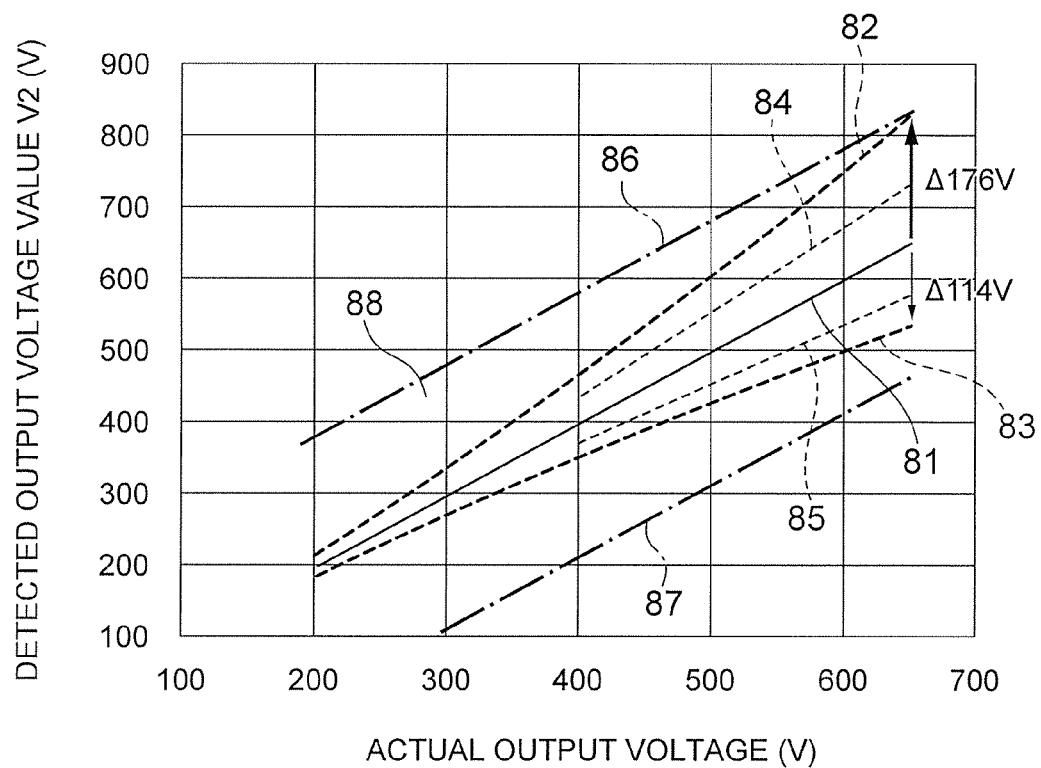
FIG. 3 is a graph for showing fluctuations in output of an output voltage detector of FIG. 1.

FIG. 3 is a graph for showing fluctuations in output of the output voltage detector 32 in a comparative example. In detection of abnormality of the voltage detection unit 30, a setting margin of a threshold value for detecting abnormality is required to be defined by taking fluctuations in characteristics of the voltage detection unit 30 as a piece of hardware into consideration, in order to prevent false detection of abnormality.

For example, when an input/output voltage condition of the voltage conversion circuit 20 and the fluctuations in characteristics of the voltage detection unit 30 are assumed to be as given below, the required setting margin is calculated as follows.

Input voltage range: 200 V to 400 V
Output voltage range: 200 V to 650 V
Fluctuations in characteristics of the normal input voltage detector 31: ±2%
Fluctuations in characteristics of the normal output voltage detector 32: ±4%

Here, as an example of comparison to the abnormality detection method based on the difference value ΔD(n), the setting margin is calculated for a case in which a method of detecting abnormality of the voltage detection unit 30 based on a difference between the estimated duty ratio value calculated by Expression (1) and an actually set duty ratio is assumed.

In this case, a maximum value of a duty ratio gap width is calculated to be 0.06. The duty ratio gap width is the width of a gap between a duty ratio set in the setting unit 41 and the estimated duty ratio value D(n). Accordingly, the setting margin in this case is required to be set to at least ±0.06 in order to avoid false detection of abnormality in the voltage detection unit 30.

In FIG. 3, the axis of abscissa represents an actual output voltage, and the axis of ordinate represents the detected output voltage value V2. A solid line 81 indicates that the detected output voltage value V2 matches the actual output voltage. When the detected output voltage value V2 is on the solid line 81, this means that the set duty ratio and the estimated duty ratio value D(n) match. That is, this indicates that the duty ratio gap width is 0 in this case. The duty ratio gap width is considered to be wider when the detected output voltage value V2 deviates farther from the solid line 81.

A broken line 82 indicates an upper limit to fluctuations of the detected output voltage value V2 in a case in which the input voltage is 200 V. A broken line 83 indicates a lower limit to the fluctuations of the detected output voltage value V2 in the case in which the input voltage is 200 V. A broken line 84 indicates an upper limit to the fluctuations of the detected output voltage value V2 in the case in which the input voltage is 400 V. A broken line 85 indicates a lower limit to the fluctuations of the detected output voltage value V2 in the case in which the input voltage is 400 V.

Thus, the fluctuations of the detected output voltage value V2 are greater when the output voltage is higher. The fluctuations of the detected output voltage value V2 are greater also when the input voltage is lower. The fluctuations of the detected output voltage value V2 are maximum when the input voltage is 200 V and the output voltage is 650 V, and a maximum magnitude of the fluctuations is 176 V. That is, a right end of the broken line 82 is 826 V. This means that, with the target voltage value set to 650 V, the output voltage detector 32 cannot be determined to be abnormal until the detected output voltage value V2 exceeds 826 V. Accordingly, a value between a dot-dash line 86 and a dot-dash line 87 is desired to be set as the setting margin 88 in order to prevent false detection of abnormality of the output voltage detector 32.

Figure 4:
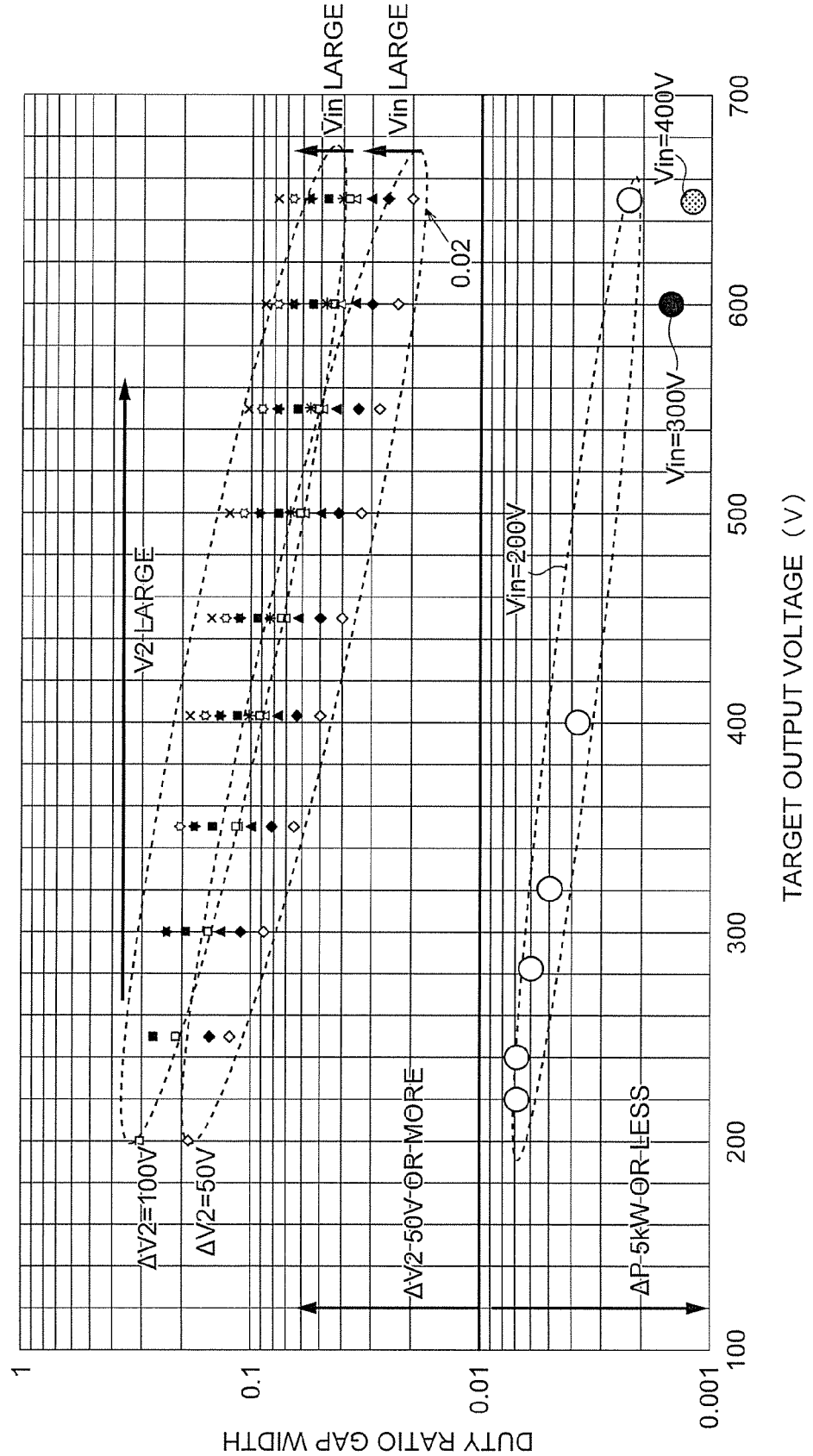
FIG. 4 is a graph for showing a width of a duty ratio gap in the power conversion device of FIG. 1, and a method of setting a predetermined range.

FIG. 4 is a graph for showing the duty ratio gap width in the power conversion device 10 of FIG. 1, and a method of setting a predetermined range of abnormality detection. The predetermined range is a range of the difference value ΔD(n) in which the voltage detection unit 30 is determined to be normal. The predetermined range is set so as to include the setting margin. FIG. 4 indicates a simulation result of the duty ratio gap width simulated when the input/output condition of the voltage conversion circuit 20 is set so that an input voltage range and an output voltage range are from 200 V to 400 V and from 200 V to 650 V, respectively. This simulation is intended for a case in which the abnormality detection unit 43 cyclically calculates the difference between the updated estimated value and the comparison reference value as a difference value, and detection of abnormality of the voltage detection unit 30 is executed based on a change in calculated difference value.

In FIG. 4, the axis of abscissa represents the target output voltage and the axis of ordinate represents the duty ratio gap width.

Circular plot marks each indicate the duty ratio gap width simulated when the voltage detection unit 30 is operating normally and the output voltage of the voltage conversion circuit 20 changes by 5 kW at maximum due to a change in output current of the voltage conversion circuit 20. Under this condition, the duty ratio gap width reaches a maximum value of 0.007 at an input voltage of 200 V and an output voltage of 220 V.

Rhomboid plot marks, on the other hand, each indicate the duty ratio gap width simulated for an assumed case in which the output voltage detector 32 has abnormality and the detected output voltage value V2 changes by 50 V under the same input/output condition. Rectangular plot marks each indicate the duty ratio gap width simulated for an assumed case in which the output voltage detector 32 has abnormality and the detected output voltage value V2 changes by 100 V under the same input/output condition.

It is understood from this simulation result that the duty ratio gap width is 0.02 or wider when the detected output voltage value V2 changes by 50 V and also when the detected output voltage value V2 changes by 100 V. In this result, an input voltage of 200 V and an output voltage of 650 V are a voltage condition under which the duty ratio gap width is minimum. In light of the simulation result described above, the predetermined range is set to 0.01 between 0.007, which is a maximum value of the duty ratio gap width in a state in which the voltage detection unit 30 is normal, and 0.02, which is a minimum value of the duty ratio gap width in a state in which the voltage detection unit 30 is abnormal.

Thus, according to the first embodiment, the duty ratio gap width can be reduced by one digit from the comparison example even when the output voltage is assumed to change by 5 kW. Accordingly, the abnormality detection method in the first embodiment can detect abnormality of the voltage detection unit 30 with a higher precision than the precision of the abnormality detection method in the comparative example.

Figure 5:
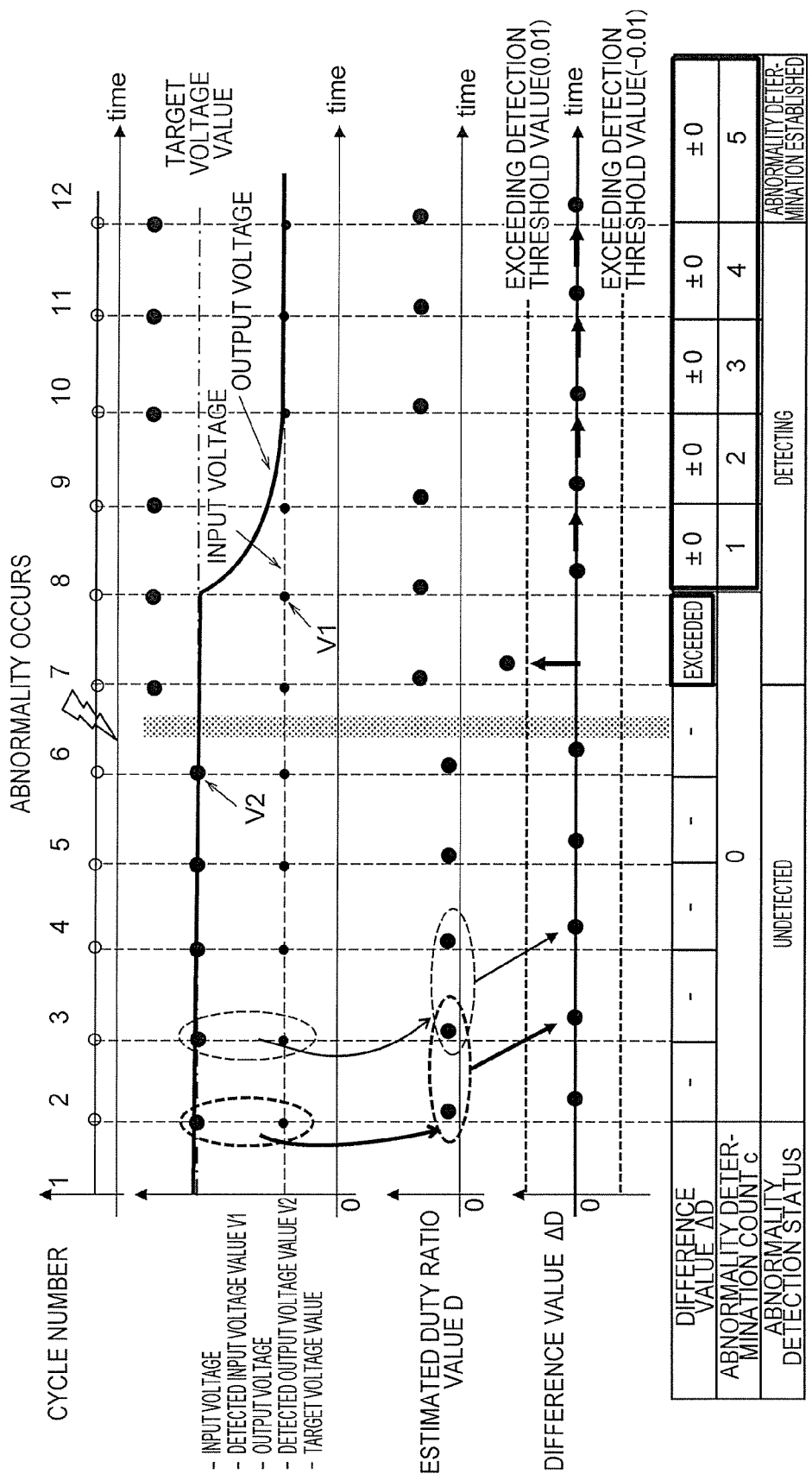
FIG. 5 is a time chart for illustrating an abnormality detection algorithm executed by a control unit of FIG. 1.

FIG. 5 is a time chart for illustrating an abnormality detection algorithm executed by the control unit 40 of FIG. 1. The axis of abscissa of FIG. 5 represents time. In FIG. 5, the cycle number, various voltages, the estimated duty ratio value D, the difference value ΔD, an abnormality determination count "c", and an abnormality detection status are shown in order from the top downward. The various voltages are the target voltage value, the input voltage, the detected input voltage value V1, the output voltage, and the detected output voltage value V2.

The cycle number indicates a control cycle which is a fixed cycle in the control unit 40. The control unit 40 executes, in regular cycles, acquisition of the detected input voltage value V1, acquisition of the detected output voltage value V2, acquisition of the target voltage value, and update of the duty ratio. The axis of abscissa indicates that, when the control cycle is set to 20 µs, for example, 20 µs pass each time the cycle number increases by 1. An example shown in FIG. 5 assumes a situation in which the output voltage detector 32 fails at a cycle number "6" and, in a cycle having a cycle number "7" and subsequent cycles, the detected output voltage value V2 remains higher than the target voltage value.

The target voltage value is indicated by a dot-dash line, and is constant in cycles from a cycle number "1" to a cycle number "12." The input voltage is indicated by a broken line, and the detected input voltage value V1 is indicated by circular plot marks. The input voltage and the detected input voltage value V1 match each other and are constant in the cycles from the cycle number "1" to the cycle number "12."

The output voltage is indicated by a solid line. The detected output voltage value V2 is indicated by circular plot marks larger than the plot marks of the detected input voltage value V1. The output voltage and the detected output voltage value V2 match the target voltage value in cycles from the cycle number "1" to a cycle number "5," and transition in a constant manner. However, the output voltage detector 32 fails from some cause at the cycle number "6," and the detected output voltage value V2 consequently increases at the cycle number "7." The detected output voltage value V2 then remains constant until the cycle number "12," at a voltage higher than the target voltage value.

The increase of the detected output voltage value V2 at the cycle number "7" is reflected on settings set by the setting unit 41 at a cycle number "8." In a cycle having the cycle number "8" and subsequent cycles, the setting unit 41 lowers the duty ratio so that the detected output voltage value V2 approaches the target voltage value, and the output voltage accordingly starts to drop from the target voltage value at the cycle number "8."

After that, the setting unit 41 keeps lowering the duty ratio because the detected output voltage value V2 remains constant at the voltage higher than the target voltage value, and ultimately sets the duty ratio to 0. The output voltage converges to the input voltage as a result. The control illustrated in FIG. 5 is merely an example, and the cycle number at which the setting unit 41 starts lowering the duty ratio is not required to be "8."

The detected output voltage value V2 rapidly changes at the cycle number "7." The estimated duty ratio value D(n) is calculated by Expression (1), and accordingly changes rapidly at the cycle number "7." In the cycle having the cycle number "8" and the subsequent cycles, the detected output voltage value V2 remains a constant value, and the estimated duty ratio value D accordingly remains at the value at the cycle number "7" as well.

For example, the difference value ΔD(6) at the cycle number "6" is a value obtained by subtracting the estimated duty ratio value D(5) at the cycle number "5" from the estimated duty ratio value D(6) at the cycle number "6." In this example, the detected input voltage value V1 and the detected output voltage value V2 do not change in the cycles from the cycle number "1" to the cycle number "6" and, accordingly, the abnormality detection unit 43 continuously calculates the difference value ΔD(n) to be 0.

However, the rapid change of the estimated duty ratio value D(7) at the cycle number "7" causes the difference value ΔD(7) to change rapidly, and the difference value ΔD(7) exceeds an exceeding detection threshold value (0.01) determined in advance. Here, the exceeding detection threshold value (0.01) is an upper limit of the predetermined range, and the exceeding detection threshold value (−0.01) is a lower limit of the predetermined range. In other words, the exceeding detection threshold value is a threshold value for determining whether the difference value ΔD(n) exceeds the predetermined range.

At the cycle number "7," the abnormality detection unit 43 detects that the difference value ΔD(n) has exceeded the predetermined range. In the cycle having the cycle number "8" and the subsequent cycles, the estimated duty ratio value D(n) does not change and, accordingly, the abnormality detection unit 43 continuously calculates the difference value ΔD(n) to be 0.

After exceeding of the difference value ΔD(n) beyond the predetermined range is detected, in a case in which the difference value ΔD(n) falls within the predetermined range five successive times, as a predetermined number of times, from a cycle next to the cycle in which the difference value ΔD(n) has exceeded the predetermined range, the abnormality detection unit 43 establishes the determination that there is abnormality in the voltage detection unit 30.

When the difference value ΔD(n) exceeds the predetermined range, the abnormality detection unit 43 changes the abnormality detection status from "undetected" to "detecting." When the abnormality detection status is changed to "detecting," the abnormality detection unit 43 starts abnormality detection processing. To give a more specific description, when the abnormality detection status is changed to "detecting," the abnormality detection unit 43 sets the abnormality determination count "c" to 0. The abnormality detection unit 43 increases the abnormality determination count "c" by 1 when the difference value ΔD(n) falls within the predetermined range in a cycle next to the cycle in which the abnormality detection status has been changed to "detecting."

In the example of FIG. 5, the difference value ΔD(n) is contained within the predetermined range in the cycles from the cycle number "8" to the cycle number "12," and the abnormality determination count "c" accordingly keeps rising to reach "5" at the cycle number "12." At this point, the abnormality detection unit 43 changes the abnormality detection status from "detecting" to "abnormality determination established."

In this manner, monitoring of the difference value ΔD(n) with phases of the abnormality detection status set up enables the abnormality detection unit 43 to notify possibility of abnormality of the voltage detection unit 30 to the host device 70 before determination of abnormality of the voltage detection unit 30 is established.

Figure 6:
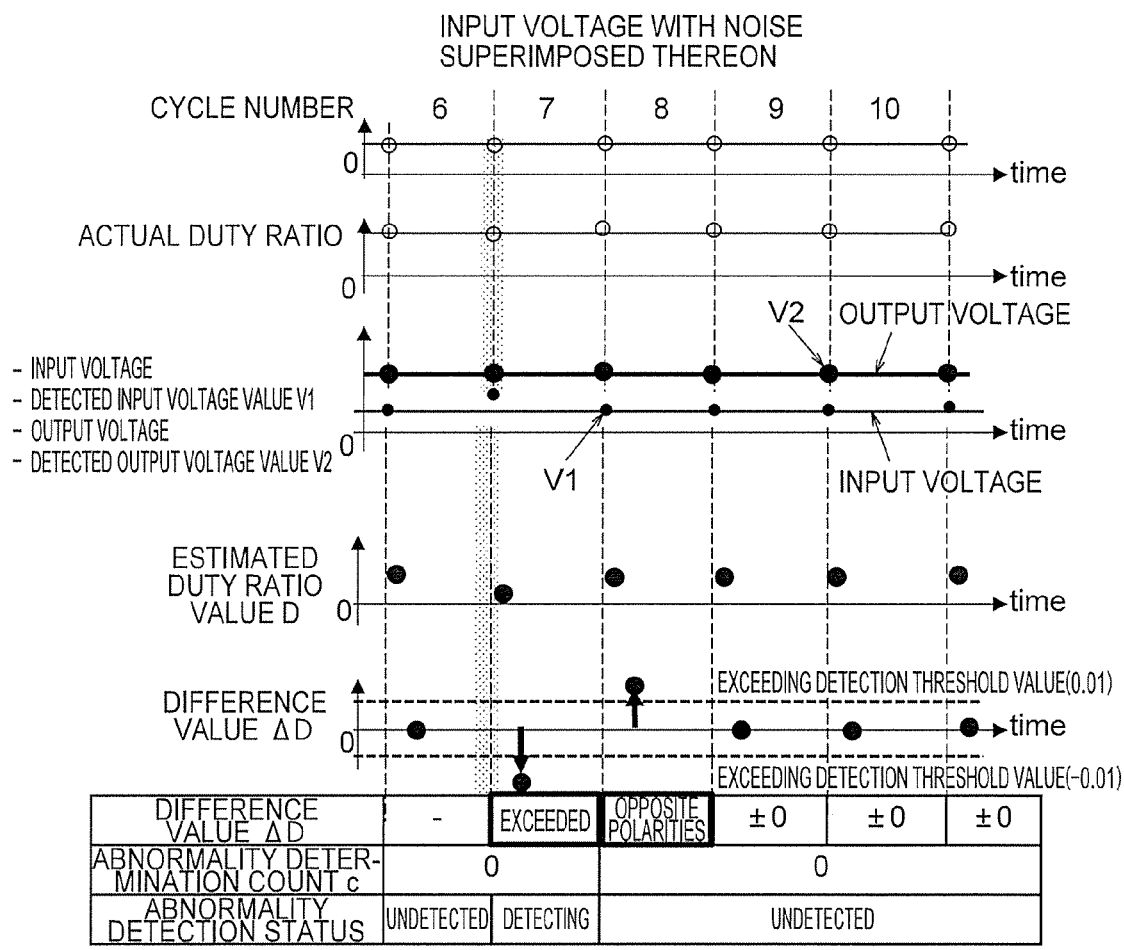
FIG. 6 is a time chart for illustrating an abnormality detection algorithm in a case in which noise is superimposed on a voltage detected by an input voltage detector of FIG. 1.

FIG. 6 is a time chart for illustrating an abnormality detection algorithm in a case in which noise is superimposed on a voltage detected by the input voltage detector 31 of FIG. 1. In a case in which momentary noise is superimposed on a voltage detected by the input voltage detector 31 at the cycle number "7," the estimated duty ratio value D(7) at the cycle number "7" changes from the estimated duty ratio value D(6) at the cycle number "6." This causes the difference value ΔD(7) at the cycle number "7" to exceed the predetermined range.

The abnormality detection unit 43 accordingly changes the abnormality detection status from "undetected" to "detecting" at the cycle number "7," and starts the abnormality determination count "c". However, in a case in which the exceeding of the difference value ΔD(7) at the cycle number "7" is caused by noise, the estimated duty ratio value D(8) at the next cycle number "8" returns to the same value as the estimated duty ratio value D in a cycle having the cycle number "6" and preceding cycles. The difference value ΔD(8) at the cycle number "8" consequently exceeds to a polarity opposite from a polarity of the exceeding of the difference value ΔD(7) at the cycle number "7."

As in this case, when exceeding of the difference value ΔD(n) beyond the predetermined range is detected in succession, and the difference value ΔD(n) exceeds the predetermined range at polarities opposite from each other in the two occurrences of exceeding detected in succession, it can be determined that the two occurrences of exceeding are caused by superimposition of noise. Accordingly, the abnormality detection unit 43 changes the abnormality detection status from "detecting" to "undetected" in this case, and temporarily ends the determination of whether there is abnormality in the voltage detection unit 30.

Figure 7:
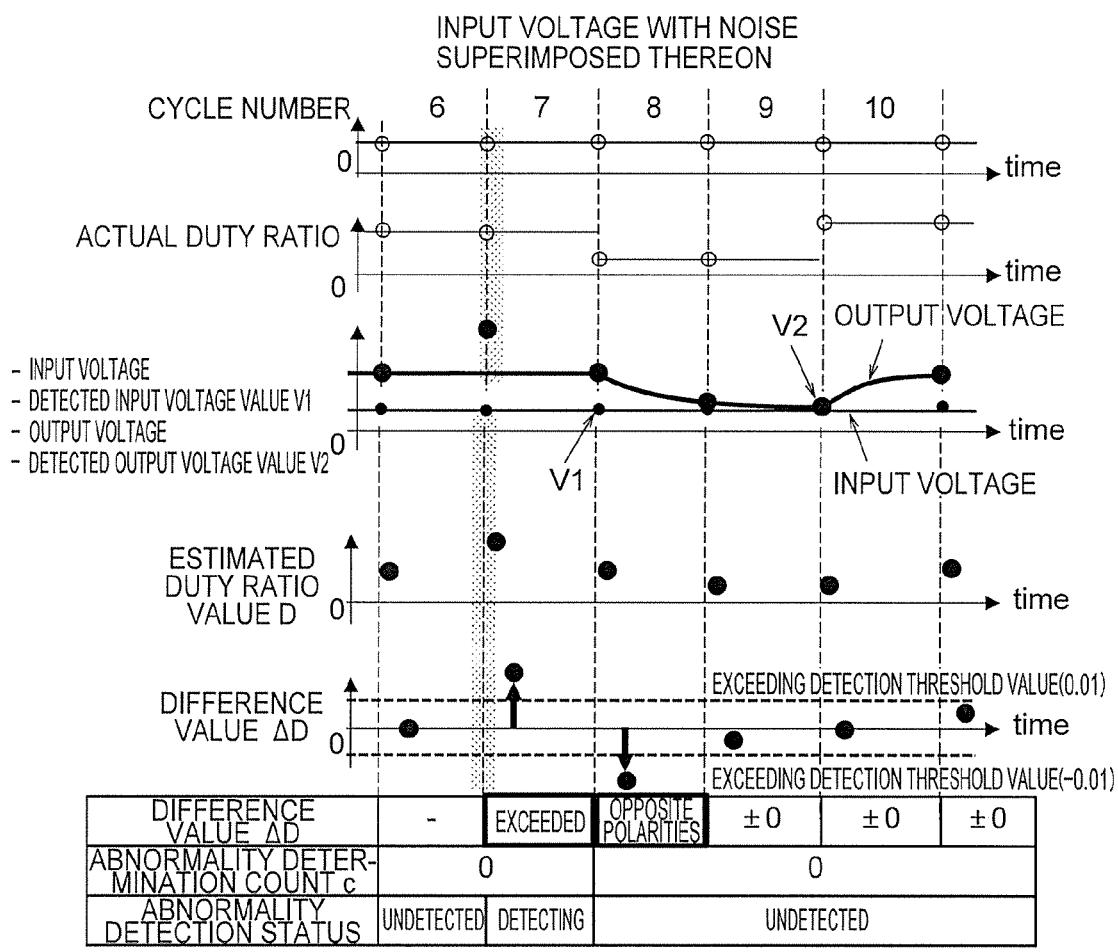
FIG. 7 is a time chart for illustrating an abnormality detection algorithm in a case in which noise is superimposed on the voltage detected by an output voltage detector of FIG. 1.

FIG. 7 is a time chart for illustrating an abnormality detection algorithm in a case in which noise is superimposed on a voltage detected by the output voltage detector 32 of FIG. 1. In a case in which momentary noise is superimposed on a voltage detected by the output voltage detector 32 at the cycle number "7," the estimated duty ratio value D(7) at the cycle number "7" changes from the estimated duty ratio value D(6) at the cycle number "6." This causes the difference value ΔD(7) at the cycle number "7" to exceed the predetermined range.

The abnormality detection unit 43 accordingly changes the abnormality detection status from "undetected" to "detecting" at the cycle number "7," and starts the abnormality determination count "c". However, in a case in which the exceeding of the difference value ΔD(7) at the cycle number "7" is caused by noise, the estimated duty ratio value D(8) at the next cycle number "8" returns to the same value as the estimated duty ratio value D in a cycle having the cycle number "6" and preceding cycles. The difference value ΔD(8) at the cycle number "8" consequently exceeds to a polarity opposite from a polarity of the exceeding of the difference value ΔD(7) at the cycle number "7".

As in this case, when exceeding of the difference value ΔD(n) beyond the predetermined range is detected in succession, and the difference value ΔD exceeds the predetermined range at polarities opposite from each other in the two occurrences of exceeding detected in succession, it can be determined that the two occurrences of exceeding are caused by superimposition of noise. Accordingly, the abnormality detection unit 43 changes the abnormality detection status from "detecting" to "undetected" in this case, and temporarily ends the determination of whether there is abnormality in the voltage detection unit 30.

The abnormality detection unit 43 detects abnormality of the voltage detection unit 30 based on a change in difference value ΔD(n), and is accordingly capable of particularly highly precise abnormality detection under conditions in which the input voltage is constant, the target voltage value is constant, and a change in output voltage caused by a change in load current is 5 kW or less. It is accordingly preferred to disable abnormality determination by the abnormality detection unit 43 under a state in which the input voltage, the target voltage value, and the load current fluctuate. The abnormality detection unit 43 temporarily disables determination about abnormality of the voltage detection unit 30, based on information on fluctuations of the detected input voltage value V1 detected by the input voltage detector 31, information on fluctuations of the target voltage value, and information on fluctuations of the load current.

Figure 8:
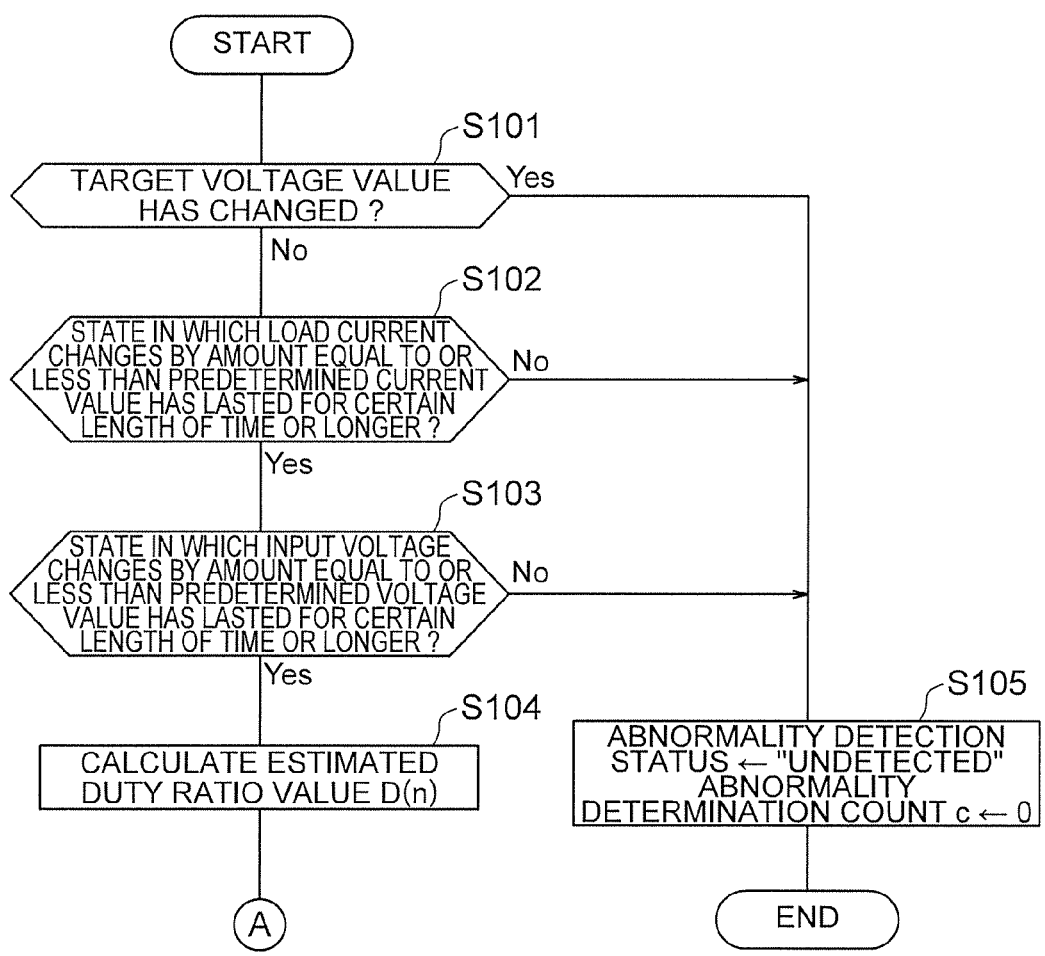
FIG. 8 is a flow chart for illustrating an abnormality detection routine executed by the control unit of FIG. 1.

FIG. 8 is a flow chart for illustrating an abnormality detection routine executed by the control unit 40 of FIG. 1. The routine of FIG. 8 is executed, for example, each time a fixed length of time elapses. When the routine of FIG. 8 is started, the control unit 40 determines, in Step S101, whether there is a change in target voltage value.

When it is determined that there is a change in target voltage value, the control unit 40 sets, in Step S105, the abnormality detection status to "undetected," and temporarily ends this routine by setting the abnormality determination count "c" to 0. When it is determined that there is no change in target voltage value, on the other hand, the control unit 40 determines, in Step S102, whether a state in which the load current changes by an amount equal to or less than a predetermined current value has lasted for a certain length of time or longer.

When it is determined that the state in which the load current changes by an amount equal to or less than a predetermined current value has not lasted for a certain length of time or longer, the control unit 40 sets, in Step S105, the abnormality detection status to "undetected," and temporarily ends this routine by setting the abnormality determination count "c" to 0.

When it is determined that the state in which the load current changes by an amount equal to or less than a predetermined current value has lasted for a certain length of time or longer, on the other hand, the control unit 40 determines, in Step S103, whether a state in which the input voltage changes by an amount equal to or less than a predetermined voltage value has lasted for a certain length of time or longer.

When it is determined that the state in which the input voltage changes by an amount equal to or less than a predetermined voltage value has not lasted for a certain length of time or longer, the control unit 40 sets, in Step S105, the abnormality detection status to "undetected," and temporarily ends this routine by setting the abnormality determination count "c" to 0.

Figure 9:
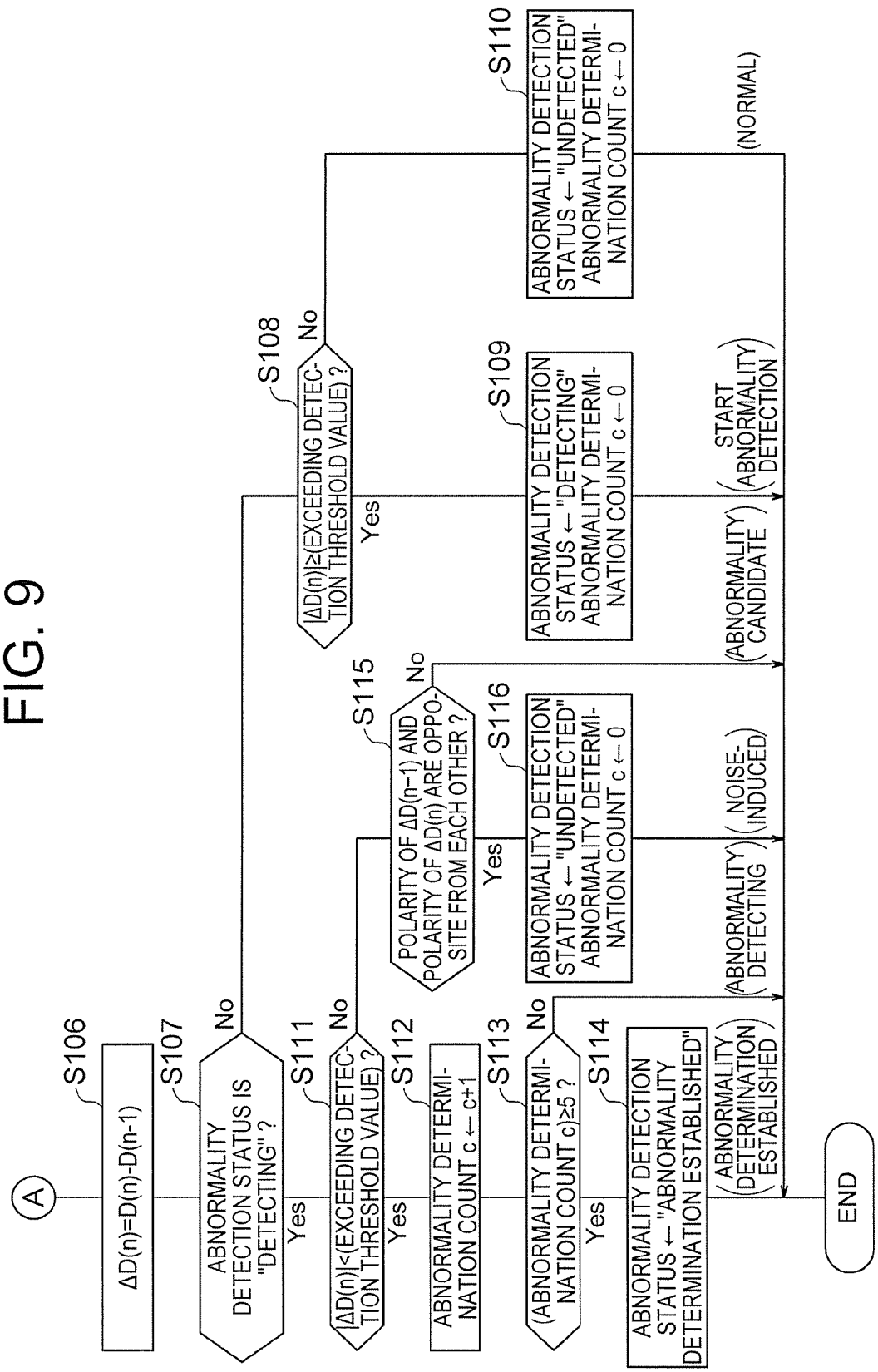
FIG. 9 is a flow chart for illustrating processing subsequent to processing of the abnormality detection routine of FIG. 8.

When it is determined that the state in which the input voltage changes by an amount equal to or less than a predetermined voltage value has lasted for a certain length of time or longer, on the other hand, the control unit 40 calculates, in Step S104, the estimated duty ratio value $D(n)$ by Expression 1, and starts a routine of FIG. 9.

FIG. 9 is a flow chart for illustrating processing subsequent to processing of the abnormality detection routine of FIG. 8. The routine of FIG. 9 is designed to be executed in continuation from Step S104 of FIG. 8. When the routine of FIG. 9 is started, the abnormality detection unit 43 calculates, in Step S106, the difference value $\Delta D(n)$ by Expression (3). That is, the abnormality detection unit 43 calculates the difference value $\Delta D(n)$ by using, as the comparison reference value Cmp, the estimated duty ratio value $D(n-1)$ acquired in a cycle that immediately precedes a cycle in which the updated estimated value is acquired.

Next, the abnormality detection unit 43 determines, in Step S107, whether the abnormality detection status is "detecting." When the abnormality detection status is not "detecting," that is, when the abnormality detection status is "undetected," the abnormality detection unit 43 determines, in Step S108, whether the absolute value $|\Delta D(n)|$ of the difference value $\Delta D(n)$ is equal to or more than the exceeding detection threshold value. In this example, the exceeding detection threshold value is 0.01.

When the absolute value $|\Delta D(n)|$ is equal to or more than the exceeding detection threshold value, the abnormality detection unit 43 changes, in Step S109, the abnormality detection status from "undetected" to "detecting," starts the abnormality determination count "c" after setting the abnormality determination count "c" to 0, and temporarily ends this routine. That is, the abnormality detection unit 43 starts the abnormality detection processing when the difference value $\Delta D(n)$ exceeds the predetermined range.

When the absolute value $|\Delta D(n)|$ is less than the exceeding detection threshold value, the abnormality detection unit 43 sets, in Step S110, the abnormality detection status to "undetected," and sets the abnormality determination count "c" to 0. Thus, when the difference value $\Delta D(n)$ is contained within the predetermined range, the abnormality detection status remains "undetected." In this case, the voltage detection unit 30 is considered to be in a normal state continuously.

When it is determined in Step S107 that the abnormality determination status is "detecting," the abnormality detection unit 43 determines, in Step S111, whether the absolute value $|\Delta D(n)|$ of the difference value $\Delta D(n)$ is less than the exceeding detection threshold value.

When the absolute value $|\Delta D(n)|$ is less than the exceeding detection threshold value, the abnormality detection unit 43 increases the abnormality determination count "c" in Step S112. The abnormality detection unit 43 next determines, in Step S113, whether the abnormality determination count "c" has reached "5."

When it is determined that the abnormality determination count "c" has not reached "5," the abnormality detection unit 43 temporarily ends this routine. That is, the abnormality detection status remains "detecting."

When it is determined that the abnormality determination count "c" has reached "5," on the other hand, the abnormality detection unit 43 changes, in Step S114, the abnormality detection status from "detecting" to "abnormality determination established," and temporarily ends this routine. That is, behavior of the difference value $\Delta D(n)$ in this case is "exceeding→within the predetermined range-→within the predetermined range→within the predetermined range→within the predetermined range→within the predetermined range." In this case, determination that there is abnormality in the voltage detection unit 30 is established.

When the abnormality detection status is set to "abnormality determination established," the control unit 40 notifies that there is abnormality in the voltage detection unit to the host device 70. The control unit 40 then follows an instruction from the host device 70 to stop, for example, the switching operation of the first switching element 21 and the switching operation of the second switching element 22. For example, under a state in which the duty ratio is fixed to a certain value, the control unit 40 performs control so that the switching operation of the first switching element 21 and the switching operation of the second switching element 22 are continued.

When it is determined in Step S111 that the absolute value $|\Delta D(n)|$ is equal to or more than the exceeding detection threshold value, this means that the difference value $\Delta D(n)$ has exceeded the exceeding detection threshold value in at least two successive circles. The abnormality detection unit 43 accordingly determines, in Step S115, whether the polarity of the last difference value $\Delta D(n-1)$ and the polarity of the difference value $\Delta D(n)$ of this time are opposite from each other.

When the polarity of the last difference value $\Delta D(n-1)$ and the polarity of the difference value $\Delta D(n)$ of this time are the same polarity, the abnormality detection unit 43 temporarily ends this routine. In this case, the operation of the voltage detection unit 30 is suspected to be unstable, and may subsequently become abnormal. That is, it is deemed at this stage that a candidate for abnormality has been detected.

When the polarity of the last difference value $\Delta D(n-1)$ and the polarity of the difference value $\Delta D(n)$ of this time are opposite from each other, the abnormality detection unit 43 changes, in Step S116, the abnormality detection status from "detecting" to "undetected." In Step S116, the abnormality detection unit 43 sets the abnormality determination count "c" to 0 as well. The abnormality detection unit 43 then temporarily ends this routine. That is, the exceeding of the difference value $\Delta D(n)$ beyond the predetermined range in this case is considered to be caused by momentary superimposition of noise on a voltage detected by the voltage detection unit 30.

Thus, the power conversion device 10 according to the first embodiment includes the voltage conversion circuit 20, the voltage detection unit 30, and the control unit 40. The voltage detection unit 30 includes the input voltage detector 31 and the output voltage detector 32. The input voltage detector 31 detects an input voltage input to the voltage conversion circuit 20 as the detected input voltage value V1. The output voltage detector 32 detects an output voltage output from the voltage conversion circuit 20 as the detected output voltage value V2. The control unit 40 controls the voltage conversion circuit 20.

The control unit 40 includes the setting unit 41, the estimated value calculation unit 42, and the abnormality detection unit 43. The setting unit 41 sets the duty ratio of the PWM signal based on the target voltage value, and outputs the PWM signal based on the set duty ratio to the voltage conversion circuit 20. The target voltage value is a target value of the output voltage. The PWM signal is a signal to be given to the voltage conversion circuit 20.

The estimated value calculation unit 42 cyclically calculates the estimated duty ratio value D(n) based on the detected input voltage value V1 and the detected output voltage value V2 with the premise of the relationship between the detected input voltage value V1 and the detected output voltage value V2. The estimated duty ratio value D(n) is a duty ratio at which the PWM signal from the setting unit 41 is supposed to be output to the voltage conversion circuit 20.

The abnormality detection unit 43 cyclically calculates, as the difference value $\Delta D(n)$, a difference between the updated estimated value and the comparison reference value Cmp, and detects abnormality of the voltage detection unit 30 based on a change in calculated difference value $\Delta D(n)$. The updated estimated value is the estimated duty ratio value D(n) newly calculated by the estimated value calculation unit 42. The comparison reference value Cmp is a value based on the estimated duty ratio value D(n) calculated by the estimated value calculation unit 42 in a cycle preceding the cycle in which the updated estimated value is calculated.

With this configuration, in the difference value $\Delta D(n)$ which is the difference between the updated estimated value and the comparison reference value Cmp, a detector fluctuation component included in the updated estimated value and a detector fluctuation component included in the comparison reference value Cmp cancel each other. The detector fluctuation component is a component of fluctuations in characteristics of the voltage detection unit 30. This enables narrowing of the setting margin, and the predetermined range for abnormality detection can accordingly be narrowed. As a result, abnormality of the voltage detection unit 30 can more appropriately be detected.

The comparison reference value Cmp is the estimated duty ratio value D(n−1) acquired in the cycle that immediately precedes the cycle in which the updated estimated value is acquired.

The detector fluctuation component depends on temperature characteristics of hardware in the voltage detection unit 30 and deterioration with age of the hardware in the voltage detection unit 30. A time of acquisition of the comparison reference value Cmp is the cycle immediately preceding the time of acquisition of the updated estimated value. Accordingly, a change in detector fluctuation component due to a temperature change and a change in detector fluctuation component due to deterioration with age that are caused by this difference in time of acquisition are negligibly small. The predetermined range for abnormality detection can accordingly be narrowed more and, as a result, abnormality of the voltage detection unit 30 can be detected with even higher precision.

The abnormality detection unit 43 determines that there is abnormality in the voltage detection unit 30 in a case in which exceeding of the difference value $\Delta D(n)$ beyond the predetermined range is detected and the cyclically calculated difference value $\Delta D(n)$ is subsequently detected to have fallen within the predetermined range five successive times.

Thus, false detection of abnormality of the voltage detection unit 30 can be reduced. In addition, before determination that there is abnormality in the voltage detection unit 30 is established, possibility of abnormality of the voltage detection unit 30 can be notified to the host device 70 at the time when the difference value $\Delta D(n)$ exceeds the predetermined range.

The abnormality detection unit 43 temporarily ends determination about whether there is abnormality in the voltage detection unit 30 in a case in which exceeding of the difference value $\Delta D(n)$ beyond the predetermined range is detected in succession, and the difference value $\Delta D(n)$ has exceeded the predetermined range at polarities opposite from each other in the two occurrences of exceeding detected in succession.

This prevents momentary superimposition of noise on a voltage detected by the voltage detection unit 30 from being falsely detected as abnormality of the voltage detection unit 30.

The abnormality detection unit 43 sets the predetermined range based on an input voltage input to the voltage conversion circuit 20 and an output voltage output from the voltage conversion circuit 20.

As shown in FIG. 3, the duty ratio gap width is narrower when the input voltage is higher. The duty ratio gap width is narrower also when the output voltage is lower. Accordingly, the predetermined range can be narrowed when the input voltage is higher, and abnormality of the voltage detection unit 30 in a case in which the input voltage is high can consequently be detected with even higher precision. The predetermined range can be narrowed also when the output voltage is lower, and abnormality of the voltage detection unit 30 in a case in which the output voltage is low can consequently be detected with even higher precision.

When the target voltage value is changed, the abnormality detection unit 43 temporarily ends abnormality detection.

With this configuration, detection of abnormality of the voltage detection unit 30 is executed under a stable state in which the target voltage value is not changed, and abnormality of the voltage detection unit 30 can accordingly be detected with even higher precision.

The abnormality detection unit 43 temporarily disables abnormality detection when a change in load 60 causes the output current of the voltage conversion circuit 20 to change by an amount equal to or greater than the predetermined current value.

With this configuration, detection of abnormality of the voltage detection unit 30 is executed with fluctuations of the load 60 suppressed, and abnormality of the voltage detection unit 30 can accordingly be detected with even higher precision.

The abnormality detection unit 43 temporarily disables abnormality detection when a voltage change of the direct current voltage source 50 causes the input voltage to change by an amount equal to or greater than the predetermined voltage value.

With this configuration, detection of abnormality of the voltage detection unit 30 is executed with fluctuations of the direct current voltage source 50 suppressed, and abnormality of the voltage detection unit 30 can accordingly be detected with even higher precision.

The predetermined range is set based on a maximum value of the duty ratio gap width, within a normal operation range of the voltage detection unit 30. The duty ratio gap width is the width of a gap between a duty ratio set based on the target voltage value and the detected output voltage value V2, and an estimated duty ratio value.

The predetermined range can thus be set more appropriately, and false detection of abnormality is accordingly reduced. As a result, abnormality of the voltage detection unit 30 can be detected more appropriately.

Second Embodiment

A power conversion device according to a second embodiment of this disclosure differs from the power conversion device 10 according to the first embodiment in that the comparison reference value calculated in the abnormality detection unit 43 is an average value of a plurality of estimated duty ratio values acquired in cycles that precede a cycle in which an updated estimated value is acquired.

Except for the point described above, a configuration of the power conversion device according to the second embodiment is similar to the configuration of the power conversion device 10 of the first embodiment. In the following, descriptions on points of the configuration that are similar to the configuration of the power conversion device 10 according to the first embodiment are omitted.

In the second embodiment, the abnormality detection unit 43 calculates the difference value $\Delta D(n)$ by using a comparison reference value $Cmp(m)$ as indicated in Expression (4). In Expression (4), "m" represents the cycle number of a cycle in which the comparison reference value $Cmp(m)$ is updated, and is an integer smaller than "n".

$$\Delta D(n)=D(n)-Cmp(m) \quad (4)$$

The comparison reference value $Cmp(m)$ is an average value of successive ten estimated duty ratio values acquired in cycles that precede the cycle in which the updated estimated value is acquired. That is, the comparison reference value $Cmp(m)$ is expressed as follows.

$$Cmp(m)=\{D(m-9)+D(m-8)+ \ldots +D(m)\}/10 \quad (5)$$

Figure 10:
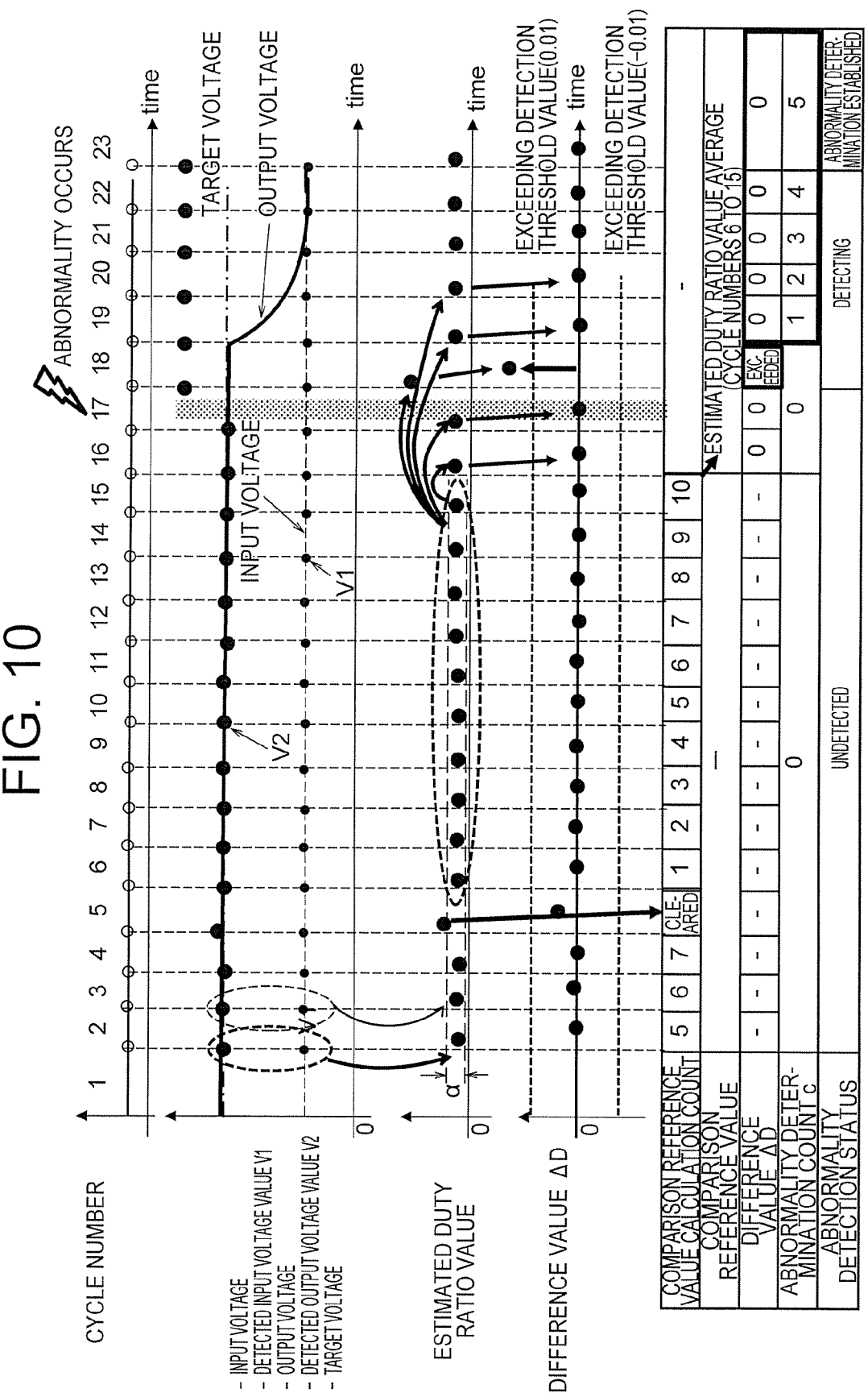
FIG. 10 is a time chart for illustrating an abnormality detection algorithm executed by a control unit of a power conversion device according to a second embodiment of this disclosure.

FIG. 10 is a time chart for illustrating an abnormality detection algorithm executed by the control unit 40 of the power conversion device according to the second embodiment. The abnormality detection unit 43 increases a comparison reference value calculation count by 1 when the calculated estimated duty ratio value $D(n)$ falls within a certain range $\alpha$. When the calculated estimated duty ratio value $D(n)$ falls outside the certain range $\alpha$, on the other hand, the abnormality detection unit 43 clears the comparison reference value calculation count.

When the comparison reference value calculation count reaches "10," that is, when the estimated duty ratio value $D(n)$ falls within the certain range $\alpha$ ten times in succession, the abnormality detection unit 43 updates the comparison reference value $Cmp(m)$. For example, the comparison reference value calculation count is 7 at the cycle number "4" but, at the cycle number "5," is cleared because the estimated duty ratio value $D(5)$ falls outside the certain range $\alpha$.

At the cycle number "6," the comparison reference value calculation count is started again from 1. In cycles from the cycle number "6" to a cycle number "15," the estimated duty ratio values $D(6)$ to $D(15)$ fall within the certain range $\alpha$ in a successive manner, and the comparison reference value calculation count consequently reaches "10" at the cycle number "15." The abnormality detection unit 43 accordingly updates the comparison reference value $Cmp(m)$ at the cycle number "15."

The abnormality detection unit 43 calculates, as the comparison reference value $Cmp(m)$, an average value of the estimated duty ratio values $D(6)$ to $D(15)$. The difference values $\Delta D(16)$ to $\Delta D(23)$ at a cycle number "16" and subsequent cycles are expressed by Expression (6) to Expression (13), respectively.

$$\Delta D(16)=D(16)-Cmp(15) \quad (6)$$

$$\Delta D(17)=D(17)-Cmp(15) \quad (7)$$

$$\Delta D(18)=D(18)-Cmp(15) \quad (8)$$

$$\Delta D(19)=D(19)-Cmp(15) \quad (9)$$

$$\Delta D(20)=D(20)-Cmp(15) \quad (10)$$

$$\Delta D(21)=D(21)-Cmp(15) \quad (11)$$

$$\Delta D(22)=D(22)-Cmp(15) \quad (12)$$

$$\Delta D(23)=D(23)-Cmp(15) \quad (13)$$

In Expression (6) to Expression (13), $Cmp(15)$ is expressed as follows.

$$Cmp(15)=\{D(6)+D(7)+ \ldots +D(15)\}/10 \quad (14)$$

A method of detecting abnormality of the voltage detection unit 30 with use of the difference value $\Delta D(n)$ is the same as the abnormality detection algorithm described in the first embodiment, and a detailed description on the method is accordingly omitted.

Figure 11:
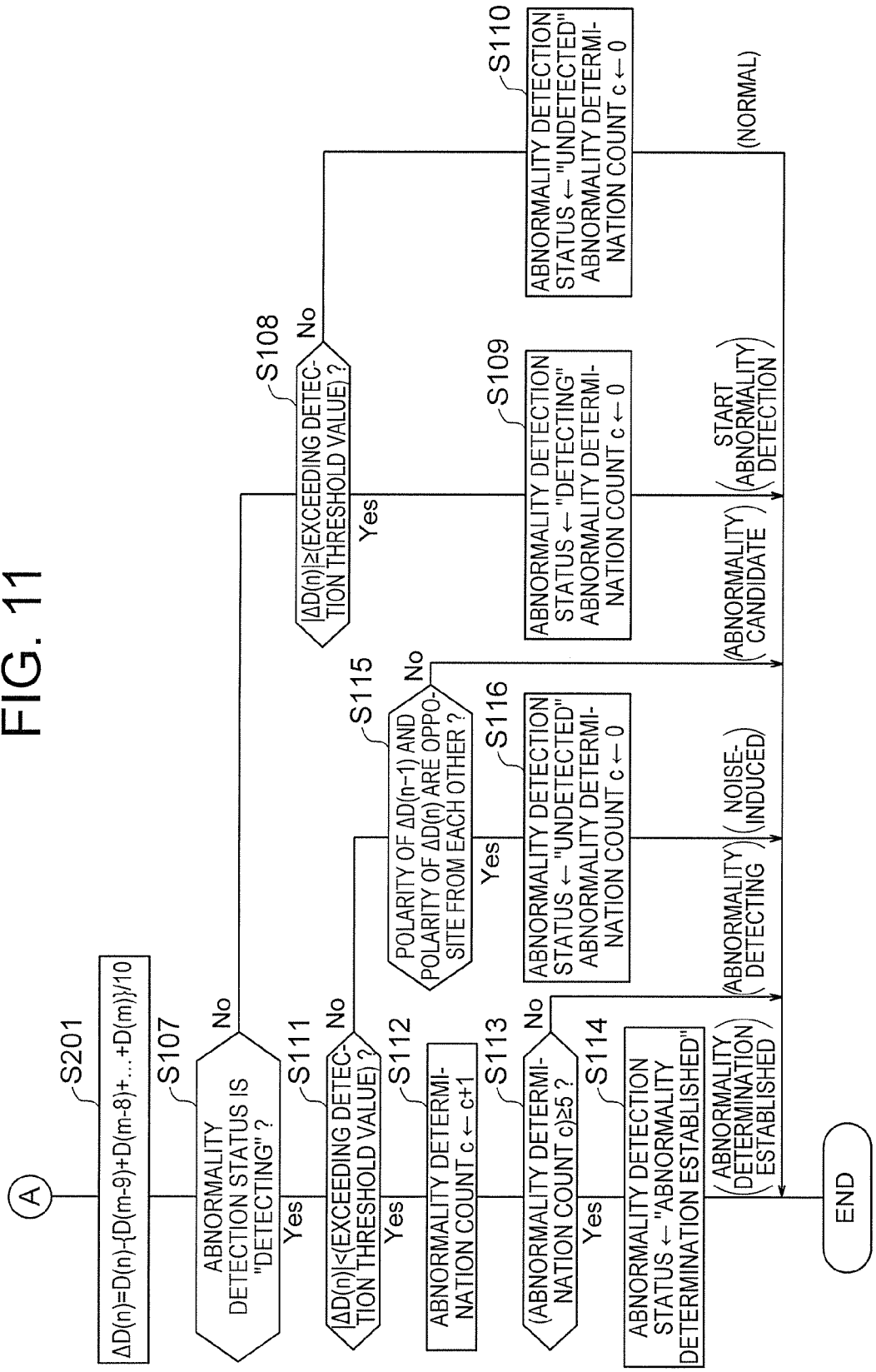
FIG. 11 is a flow chart for illustrating an abnormality detection routine executed by the control unit of the power conversion device according to the second embodiment.

FIG. 11 is a flow chart for illustrating an abnormality detection routine executed by the control unit 40 of the power conversion device 10 according to the second embodiment. A routine of FIG. 11 is designed to be executed in continuation from Step S104 of FIG. 8. That is, the control unit 40 of the power conversion device 10 according to the second embodiment executes the abnormality detection routine of FIG. 8 first.

When the routine of FIG. 11 is started, the abnormality detection unit 43 calculates, in Step S201, the difference value $\Delta D(n)$ by Expression (4) and Expression (5). That is, the abnormality detection unit 43 calculates the difference value $\Delta D(n)$ with the comparison reference value Cmp set to an average value of ten successive estimated duty ratio values acquired in cycles that precede the cycle in which the updated estimated value is acquired.

Subsequent processing steps of from Step S107 to Step S116 are the same as the processing steps of from Step S107 to Step S116 of FIG. 9, and descriptions thereof are accordingly omitted.

The comparison reference value Cmp is thus an average value of ten successive estimated duty ratio values acquired in cycles that precede the cycle in which the updated estimated value is acquired.

With this configuration, influence of noise superimposed on one of the ten estimated duty ratio values used to calculate the comparison reference value Cmp is diminished by averaging the ten estimated duty ratio values. Noise resistance is accordingly higher than in the method that uses, as the comparison reference value Cmp, the estimated duty ratio value D(n−1) acquired in the cycle that immediately precedes the cycle in which the updated estimated value is acquired.

The comparison reference value Cmp may be calculated by, for example, substituting an average value of ten successive values each detected as the detected input voltage value V1 for V1 in Expression (1), and substituting an average value of ten successive values each detected as the detected output voltage value V2 for V2 in Expression (1).

The number of values that are each the estimated duty ratio value D and that are to be averaged as the comparison reference value Cmp is not limited to ten. Values that are each the estimated duty ratio value D and that are to be averaged as the comparison reference value Cmp are not always required to be estimated duty ratio values acquired in successive cycles. For example, the estimated duty ratio D in a deviation cycle may be excluded from among values that are each the estimated duty ratio value D and that are to be averaged. The term "deviation cycle" means a cycle in which the estimated duty ratio value D falls outside the certain range α. In an example illustrated in FIG. 10, the comparison reference value Cmp may be calculated with use of estimated duty ratio values in the cycles from the cycle number "2" to the cycle number "4" and estimated duty ratio values in the cycles from the cycle number "6" to the cycle number "15."

The comparison reference value Cmp is preferred to be updated when the input voltage input to the voltage conversion circuit 20 is changed, and also when the output voltage output from the voltage conversion circuit 20 is changed.

With fluctuations in characteristics of the voltage detection unit 30 taken into consideration, the comparison reference value Cmp is preferred to be updated regularly. For example, the comparison reference value Cmp is preferred to be updated for every fixed period by taking a time constant of temperature changes of the voltage detection circuit 30 into consideration.

The first embodiment and the second embodiment may be combined in a manner suited to individual cases. For example, to update the comparison reference value Cmp in the second embodiment, a length of time of at least ten cycles is required since the start of processing of updating until the comparison reference value Cmp is newly set. Accordingly, until a new value is finished to be set as the comparison reference value Cmp, the estimated duty ratio value D(n−1) acquired in a cycle that immediately precedes the cycle in which the updated estimated value is acquired may be used as the comparison reference value Cmp. In this manner, detection of abnormality of the voltage detection unit 30 can be executed even for a duration in which the comparison reference value calculation is rising.

In the first embodiment and the second embodiment, it is determined that there is abnormality in the voltage detection unit 30 when the difference value ΔD(n) is detected to have fallen within the predetermined range five successive times as the predetermined number of times. The predetermined number of times, however, is not limited to five times, and may be changed to suit individual cases.

The first embodiment and the second embodiment take a case in which the output voltage detector 32 fails as an example. However, the abnormality detection unit 43 is capable of detecting abnormality of the voltage detection unit 30 also in a case in which the input voltage detector 31 fails.

In the first embodiment and the second embodiment, when abnormality is detected in the voltage detection unit 30, determination about which of the input voltage detector 31 and the output voltage detector 32 has the abnormality is not executed. Accordingly, which of the input voltage detector 31 and the output voltage detector 32 has the abnormality may be determined in, for example, a manner described below.

When abnormality is detected in the voltage detection unit 30, the abnormality detection unit 43 compares the detected input voltage value V1 and a detected value of a voltage sensor for monitoring the output voltage of the direct current voltage source 50. The voltage sensor may be a voltage sensor provided in the direct current voltage source 50, or may be provided in the power conversion device.

When a difference between the detected input voltage value V1 and the detected value of the voltage sensor is equal to or more than an input voltage determination value, the abnormality detection unit 43 can determine that the abnormality is located in the input voltage detector 31. The input voltage determination value is a value for determining whether the detected input voltage value V1 is exhibiting an abnormal value. When the difference between the detected input voltage value V1 and the detected value of the voltage sensor is less than the input voltage determination value, on the other hand, it can be determined that the abnormality is located in the output voltage detector 32.

In a case of a motor load, the output voltage of the voltage conversion circuit 20 can be estimated based on torque of the motor 62, the number of revolutions of the motor 62, a capacitance value of the output capacitor 24, and a switching frequency of the voltage conversion circuit 20. Accordingly, when abnormality is detected in the voltage detection unit 30, the abnormality detection unit 43 estimates the detected output voltage value V2 based on the load current value. When a difference between the detected output voltage value V2 and the estimated output voltage is equal to or more than an output voltage determination value, the abnormality detection unit 43 can determine that the abnormality is located in the output voltage detector 32. The output voltage determination value is a value for determining whether the detected output voltage value V2 is exhibiting an abnormal value. When the difference between the detected output voltage value V2 and the estimated output voltage is less than the output voltage determination value, on the other hand, it can be determined that the abnormality is located in the input voltage detector 31.

When abnormality is detected in the voltage detection unit the abnormality detection unit 43 may, after instructing the setting unit 41 to set a step-up ratio in the voltage conversion circuit 20 to 1, determine which of the input voltage detector 31 and the output voltage detector 32 has the abnormality as follows.

When the step-up ratio is set to 1, that is, when the duty ratio is set to 0, the abnormality detection unit 43 may compare the detected input voltage value V1, the detected output voltage value V2, and the detected value of the voltage sensor. When the input voltage detector 31 is experiencing a failure, the detected input voltage value V1 differs from the other two detected values. When the output voltage detector 32 is experiencing a failure, the detected output voltage value V2 differs from the other two detected values.

Accordingly, the abnormality detection unit 43 can determine that the abnormality is located in the input voltage detector 31 when, out of the detected input voltage value V1, the detected output voltage value V2, and the detected value of the voltage sensor, the detected input voltage value V1 differs from the other two detected values. The abnormality detection unit 43 can determine that the abnormality is located in the output voltage detector 32 when, out of the detected input voltage value V1, the detected output voltage value V2, and the detected value of the voltage sensor, the detected output voltage value V2 differs from the other two detected values.

In the case in which the duty ratio is set to 0, the abnormality detection unit 43 may compare the detected input voltage value V1, the detected output voltage value V2, and an estimated output voltage. When the input voltage detector 31 is experiencing a failure, the detected input voltage value V1 differs from the detected output voltage value V2 and the estimated output voltage. When the output voltage detector 32 is experiencing a failure, the detected output voltage value V2 differs from the detected input voltage value V1 and the estimated output voltage.

Accordingly, the abnormality detection unit 43 can determine that the abnormality is located in the input voltage detector 31 when, out of the detected input voltage value V1, the detected output voltage value V2, and the estimated output voltage, the detected input voltage value V1 differs from the detected output voltage value V2 and the estimated output voltage. The abnormality detection unit 43 can determine that the abnormality is located in the output voltage detector 32 when, out of the detected input voltage value V1, the detected output voltage value V2, and the estimated output voltage, the detected output voltage value V2 differs from the detected input voltage value V1 and the estimated output voltage.

In the first embodiment and the second embodiment, the setting unit 41 sets the duty ratio of the PWM signal through PI control. The setting unit 41, however, may set the duty ratio of the PWM signal through PID control.

In the power conversion device 10 according to each of the first embodiment and the second embodiment, feedback control is employed for PWM control. The power conversion device 10, however, is not limited to a device in which feedback control is employed for PWM control. For example, control with the duty ratio fixed and feed-forward control may be employed for PWM control in the power conversion device 10.

In the voltage conversion circuit 20 in each of the first embodiment and the second embodiment, only a current flowing from the source to the drain flows in the first switching element 21 in principle. The first switching element 21 may accordingly be replaced with a diode. In this case, the diode is placed so that an anode terminal of the diode corresponds to the source terminal of the first switching element 21, and so that a cathode terminal of the diode corresponds to the drain terminal of the first switching element 21.

A MOSFET formed from a SiC semiconductor is used for each of the first switching element 21 and the second switching element 22. The MOSFET, however, may be formed from a Si semiconductor. Instead of the MOSFET, an insulated gate bipolar transistor (IGBT) or a gallium nitride high electron mobility transistor (GaN-HEMT) may be used.

In each of the first switching element 21 and the second switching element 22, the anti-parallel diode is built in the MOSFET, but may be externally attached to the MOSFET.

In the first embodiment and the second embodiment, the configuration of the voltage conversion circuit 20 has a circuit configuration of a step-up DC/DC converter that has one phase and one level, but is not limited to a step-up DC/DC converter that has one phase and one level. The voltage conversion circuit 20 may be configured as a step-down DC/DC converter or a step-up/step-down DC/DC converter. The voltage conversion circuit 20 may also be configured as a multi-phase DC/DC converter or a multi-level DC/DC converter.

Figure 12:
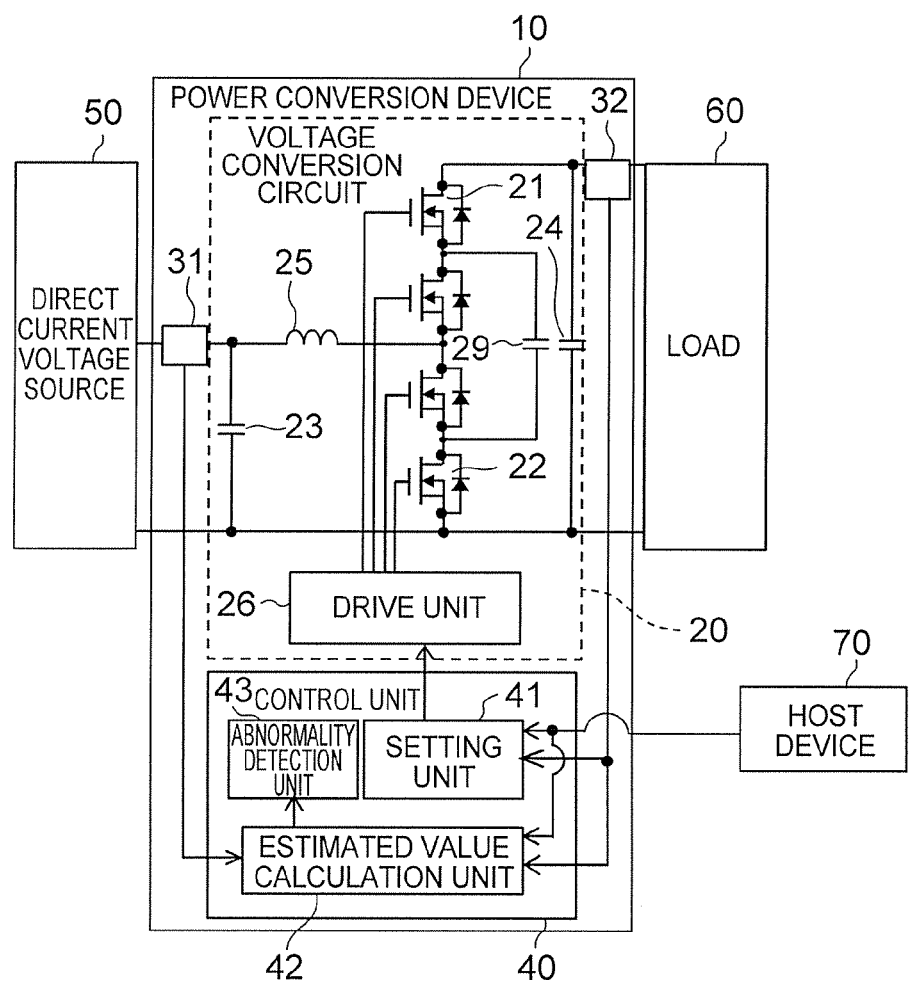
FIG. 12 is a diagram for illustrating an example of applying a multi-level step-up DC/DC converter that has two levels to a voltage conversion circuit.
Figure 13:
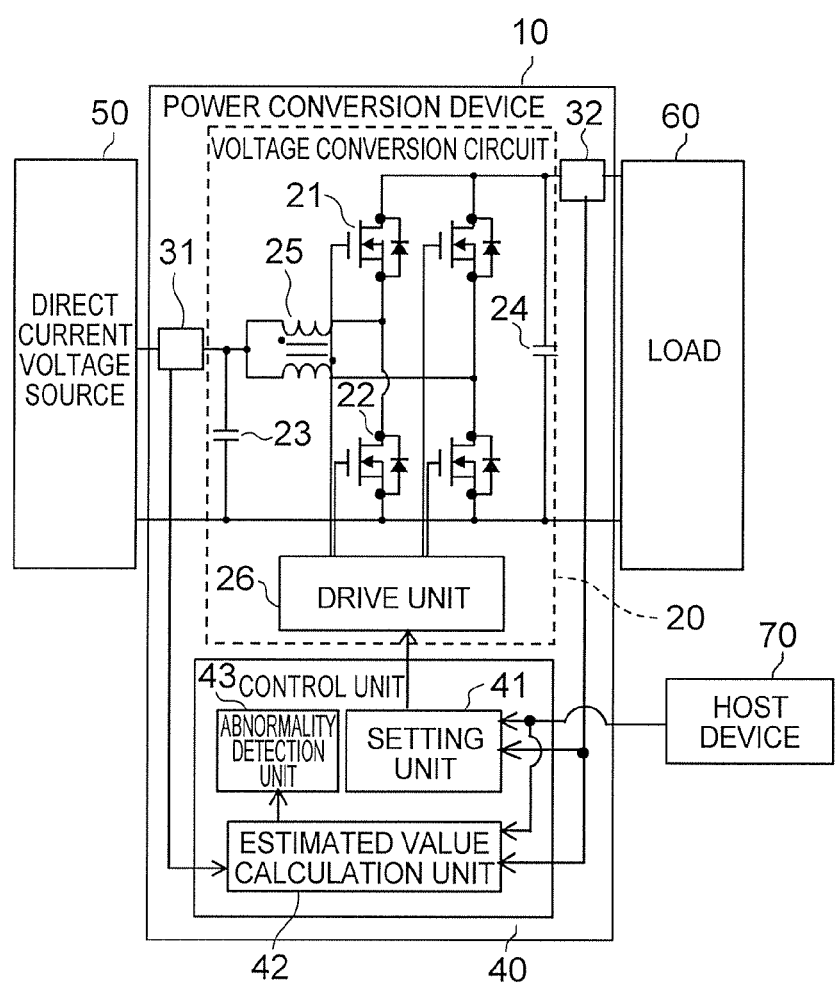
FIG. 13 is a diagram for illustrating an example of applying a multi-phase step-up DC/DC converter that has two phases to the voltage conversion circuit.
Figure 14:
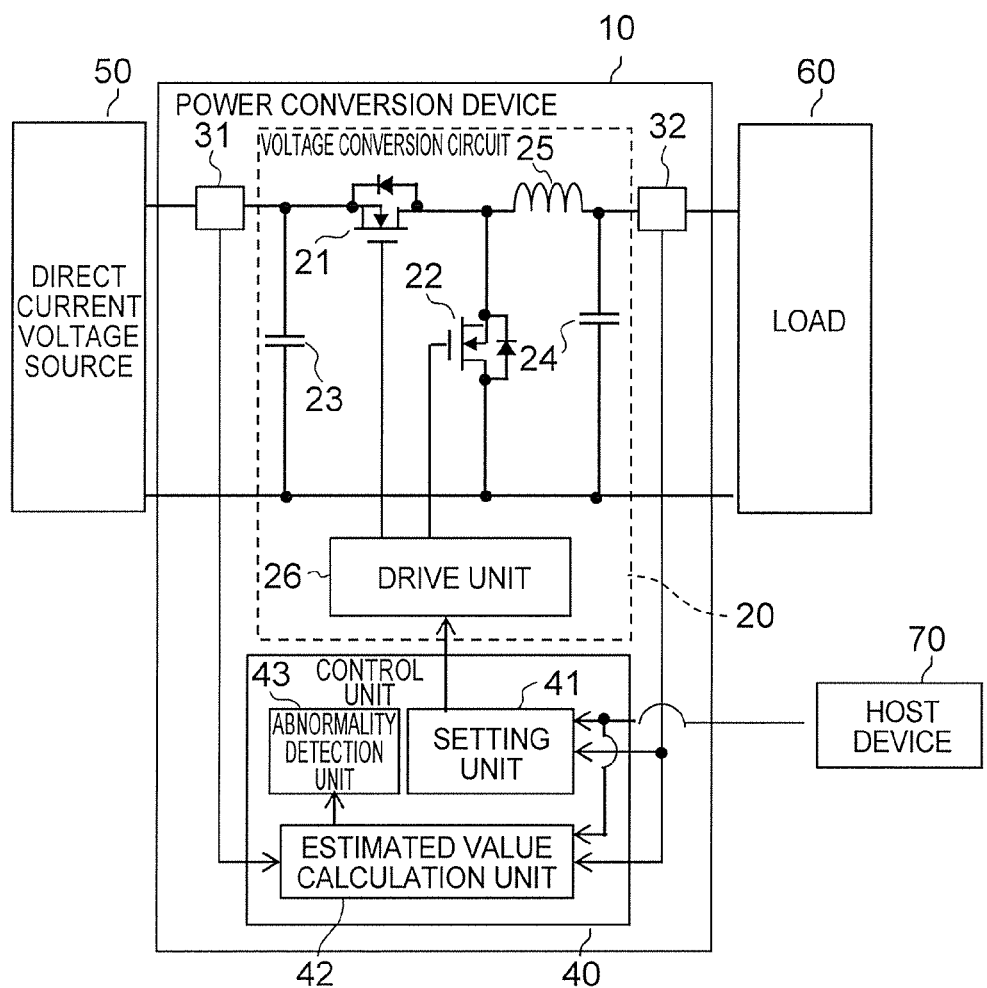
FIG. 14 is a diagram for illustrating an example of applying a step-down DC/DC converter that has one phase and one level to the voltage conversion circuit.

FIG. 12 is a diagram for illustrating an example of applying a multi-level step-up DC/DC converter that has two levels to the voltage conversion circuit 20. FIG. 13 is a diagram for illustrating an example of applying a multi-phase step-up DC/DC converter that has two phases to the voltage conversion circuit 20. FIG. 14 is a diagram for illustrating an example of applying a step-down DC/DC converter that has one phase and one level to the voltage conversion circuit 20. FIG. is a diagram for illustrating an example of applying a step-up/step-down DC/DC converter that has one phase and one level to the voltage conversion circuit 20.

The estimated duty ratio value D(n) in the voltage conversion circuit 20 of FIG. 12 and the voltage conversion circuit 20 of FIG. 13 is expressed by Expression (1). The estimated duty ratio value D(n) in the voltage conversion circuit of FIG. 14 is expressed by Expression (15).

$$D(n)=V2(n)/V1(n) \quad (15)$$

Figure 15:
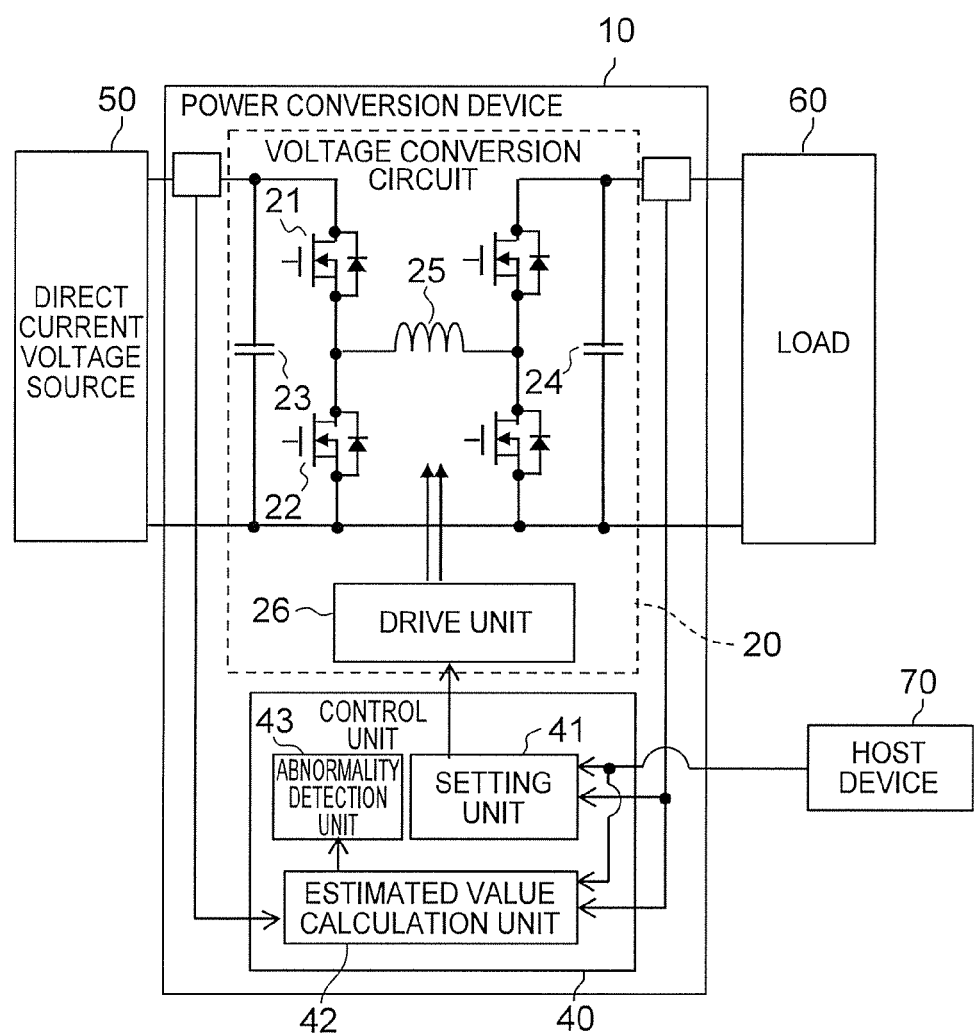
FIG. 15 is a diagram for illustrating an example of applying a step-up/step-down DC/DC converter that has one phase and one level to the voltage conversion circuit.

The estimated duty ratio value D(n) in the voltage conversion circuit 20 of FIG. 15 is expressed by Expression (1) when "input voltage<output voltage" is true, that is, during step-up operation, and is expressed by Expression (15) when "input voltage>output voltage" is true, that is, during step-down operation.

The estimated duty ratio value D(n) is calculable with use of the input voltage and the output voltage also in a voltage conversion circuit having a configuration different from the circuit configurations illustrated in FIG. 1 and FIG. 12 to FIG. Accordingly, in this disclosure, the calculation expression of the estimated duty ratio value D(n) is appropriately changed to suit the circuit configuration of the voltage conversion circuit.

In the first embodiment and the second embodiment, a secondary cell is used as the direct current voltage source 50. Alternatively, a fuel cell or other direct current voltage sources may be used.

Figure 16:
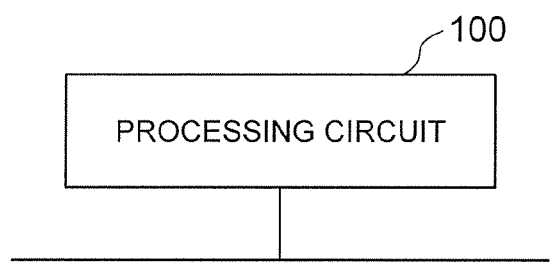
FIG. 16 is a configuration diagram for illustrating a first example of a processing circuit that implements functions of the power conversion devices according to the first embodiment and the second embodiment.

The functions of the power conversion devices 10 according to the first embodiment and the second embodiment are implemented by a processing circuit. FIG. 16 is a configuration diagram for illustrating a first example of a processing circuit that implements the functions of the power conversion devices 10 according to the first embodiment and the second embodiment. A processing circuit 100 of the first example is dedicated hardware.

The processing circuit 100 corresponds to, for example, a single circuit, a complex circuit, a programmed processor, a processor for a parallel program, an application specific integrated circuit (ASIC), a field programmable gate array (FPGA), or a combination thereof.

Figure 17:
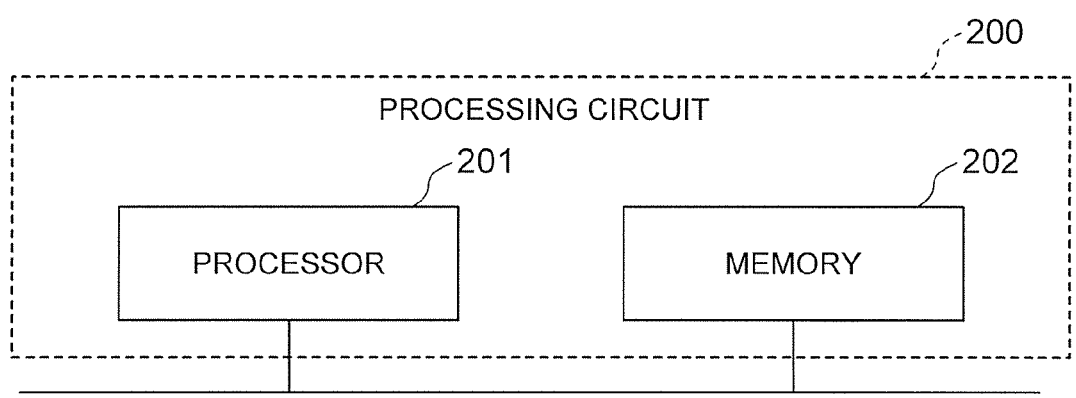
FIG. 17 is a configuration diagram for illustrating a second example of the processing circuit that implements the functions of the power conversion devices according to the first embodiment and the second embodiment.

FIG. 17 is a configuration diagram for illustrating a second example of the processing circuit that implements the functions of the power conversion devices 10 according to the first embodiment and the second embodiment. A processing circuit 200 of the second example includes a processor 201 and a memory 202.

In the processing circuit 200, the functions of the power conversion devices 10 are implemented by software, firmware, or a combination of software and firmware. The software and the firmware are described as programs to be stored in the memory 202. The processor 201 reads out and executes the programs stored in the memory 202, to thereby implement the functions.

The programs stored in the memory 202 can also be regarded as programs for causing a computer to execute the procedure or method of each of the above-mentioned units. In this case, the memory 202 corresponds to, for example, a nonvolatile or volatile semiconductor memory, such as a random access memory (RAM), a read only memory (ROM), a flash memory, an erasable programmable read only memory (EPROM), or an electrically erasable and programmable read only memory (EEPROM). A magnetic disk, a flexible disk, an optical disc, a compact disc, a mini disc, or a DVD may also correspond to the memory 202.

The functions of the above-mentioned power conversion devices 10 may be implemented partially by dedicated hardware, and partially by software or firmware.

In this way, the processing circuit can implement the functions of the above-mentioned power conversion devices 10 by hardware, software, firmware, or a combination thereof.

In the description above, the preferred embodiments and the like are described in detail, but this disclosure is not limited to the embodiments described above. Various modifications and replacement can be made to the above-mentioned embodiments without departing from the scope described in the appended claims.

In the following, various aspects of this disclosure are collectively described as supplementary notes.

(Supplementary Note 1)

A power conversion device, including: a voltage conversion circuit; a voltage detection unit including: an input voltage detector configured to detect, as a detected input voltage value, an input voltage input to the voltage conversion circuit; and an output voltage detector configured to detect, as a detected output voltage value, an output voltage output from the voltage conversion circuit; and a control unit configured to control the voltage conversion circuit, the control unit including: a setting unit configured to set, based on a target voltage value which is a target value of the output voltage, a duty ratio of a PWM signal to be given to the voltage conversion circuit, and configured to output the PWM signal based on the set duty ratio to the voltage conversion circuit; an estimated value calculation unit configured to cyclically calculate, based on the detected input voltage value and the detected output voltage value, an estimated duty ratio value which is a duty ratio of the PWM signal supposed to be output from the setting unit to the voltage conversion circuit with a premise of a relationship between the detected input voltage value and the detected output voltage value; and an abnormality detection unit configured to detect abnormality of the voltage detection unit based on a change of a difference value, the difference value being a cyclically calculated difference between an updated estimated value and a comparison reference value, the updated estimated value being the estimated duty ratio value newly calculated by the estimated value calculation unit, the comparison reference value being based on the estimated duty ratio value calculated by the estimated value calculation unit in a cycle prior to a cycle in which the updated estimated value is calculated.

(Supplementary Note 2)

The power conversion device according to Supplementary Note 1, wherein the comparison reference value is the estimated duty ratio value acquired in a cycle that immediately precedes the cycle in which the updated estimated value is acquired.

(Supplementary Note 3)

The power conversion device according to Supplementary Note 1, wherein the comparison reference value is an average value of a plurality of the estimated duty ratio values acquired in cycles that precede the cycle in which the updated estimated value is acquired.

(Supplementary Note 4)

The power conversion device according to any one of Supplementary Notes 1 to 3, wherein the abnormality detection unit is configured to determine that the voltage detection unit has abnormality when, after the difference value is detected to have exceeded a predetermined range, the cyclically calculated difference value is detected to have fallen within the predetermined range a predetermined number of times in succession.

(Supplementary Note 5)

The power conversion device according to any one of Supplementary Notes 1 to 4, wherein the abnormality detection unit is configured to temporarily end determination about whether the voltage detection unit has abnormality when the difference value is detected, in succession, to have exceeded a predetermined range, and the difference value exceeds the predetermined range at polarities opposite from each other in two occurrences of the exceeding detected in succession.

(Supplementary Note 6)

The power conversion device according to Supplementary Note 4 or 5, wherein the abnormality detection unit is configured to set the predetermined range based on the input voltage input to the voltage conversion circuit and the output voltage output from the voltage conversion circuit.

(Supplementary Note 7)

The power conversion device according to any one of Supplementary Notes 1 to 6, wherein the abnormality detection unit is configured to temporarily disable detection of the abnormality when the target voltage value is changed.

(Supplementary Note 8)

The power conversion device according to any one of Supplementary Notes 1 to 7, wherein the abnormality detection unit is configured to temporarily disable detection of the abnormality when a change in load causes an output current of the voltage conversion circuit to change by an amount equal to or greater than a predetermined current value.

(Supplementary Note 9)

The power conversion device according to any one of Supplementary Notes 1 to 8, wherein the abnormality detection unit is configured to temporarily disable detection of the abnormality when a change in voltage of an external power source causes the input voltage to change by an amount equal to or greater than a predetermined voltage value.

(Supplementary Note 10)

The power conversion device according to Supplementary Note 4 or 5, wherein the predetermined range is set based on a maximum value of a duty ratio gap width, the duty ratio gap width being a width of a gap between the duty ratio set based on the target voltage value and on the detected output voltage value, and the estimated duty ratio value, in a normal operation range of the voltage detection unit.

What is claimed is:

1. A power conversion device, comprising:
a voltage conversion circuit;
voltage detection circuitry including:
an input voltage detector configured to detect, as a detected input voltage value, an input voltage input to the voltage conversion circuit; and
an output voltage detector configured to detect, as a detected output voltage value, an output voltage output from the voltage conversion circuit; and
control circuitry configured to control the voltage conversion circuit,
the control circuitry including:
setting circuitry configured to set, based on a target voltage value which is a target value of the output voltage, a duty ratio of a PWM signal to be given to the voltage conversion circuit, and configured to output the PWM signal based on the set duty ratio to the voltage conversion circuit;
estimated value calculation circuitry configured to cyclically calculate, based on the detected input voltage value and the detected output voltage value, an estimated duty ratio value which is a duty ratio of the PWM signal supposed to be output from the setting circuitry to the voltage conversion circuit with a premise of a relationship between the detected input voltage value and the detected output voltage value; and
abnormality detection circuitry configured to detect abnormality of the voltage detection circuitry based on a change of a difference value, the difference value being a cyclically calculated difference between an updated estimated value and a comparison reference value, the updated estimated value being the estimated duty ratio value newly calculated by the estimated value calculation circuitry, the comparison reference value being based on the estimated duty ratio value calculated by the estimated value calculation circuitry in a cycle prior to a cycle in which the updated estimated value is calculated.

2. The power conversion device according to claim 1, wherein the comparison reference value is the estimated duty ratio value acquired in a cycle that immediately precedes the cycle in which the updated estimated value is acquired.

3. The power conversion device according to claim 1, wherein the comparison reference value is an average value of a plurality of the estimated duty ratio values acquired in cycles that precede the cycle in which the updated estimated value is acquired.

4. The power conversion device according to claim 1, wherein the abnormality detection circuitry is configured to determine that the voltage detection circuitry has abnormality when, after the difference value is detected to have exceeded a predetermined range, the cyclically calculated difference value is detected to have fallen within the predetermined range a predetermined number of times in succession.

5. The power conversion device according to claim 4, wherein the abnormality detection circuitry is configured to set the predetermined range based on the input voltage input to the voltage conversion circuit and the output voltage output from the voltage conversion circuit.

6. The power conversion device according to claim 4, wherein the predetermined range is set based on a maximum value of a duty ratio gap width, the duty ratio gap width being a width of a gap between the duty ratio set based on the target voltage value and on the detected output voltage value, and the estimated duty ratio value, in a normal operation range of the voltage detection circuitry.

7. The power conversion device according to claim 1, wherein the abnormality detection circuitry is configured to temporarily end determination about whether the voltage detection circuitry has abnormality when the difference value is detected, in succession, to have exceeded a predetermined range, and the difference value exceeds the predetermined range at polarities opposite from each other in two occurrences of the exceeding detected in succession.

8. The power conversion device according to claim 1, wherein the abnormality detection circuitry is configured to temporarily disable detection of the abnormality when the target voltage value is changed.

9. The power conversion device according to claim 1, wherein the abnormality detection circuitry is configured to temporarily disable detection of the abnormality when a change in load causes an output current of the voltage conversion circuit to change by an amount equal to or greater than a predetermined current value.

10. The power conversion device according to claim 1, wherein the abnormality detection circuitry is configured to temporarily disable detection of the abnormality when a change in voltage of an external power source causes the input voltage to change by an amount equal to or greater than a predetermined voltage value.

* * * * *